(12) United States Patent
Stoddard et al.

(10) Patent No.: US 12,365,553 B2
(45) Date of Patent: Jul. 22, 2025

(54) CONTAINER UNLOADING APPARATUS AND METHOD FOR CONTROLLING THE SAME

(71) Applicant: Southworth International Group, Inc., Falmouth, ME (US)

(72) Inventors: Scott Stoddard, Gorham, ME (US); Emmanuel Marsh-Sachs, Sidney, ME (US); Jonathan Graeme Robertson, Biddeford, ME (US)

(73) Assignee: Southworth International Group, Inc., Falmouth, ME (US)

( * ) Notice: Subject to any disclaimer, the term of this patent is extended or adjusted under 35 U.S.C. 154(b) by 0 days.

(21) Appl. No.: 18/771,180

(22) Filed: Jul. 12, 2024

(65) Prior Publication Data
US 2025/0019187 A1    Jan. 16, 2025

Related U.S. Application Data

(60) Provisional application No. 63/607,182, filed on Dec. 7, 2023, provisional application No. 63/526,587, filed on Jul. 13, 2023.

(51) Int. Cl.
*B65G 65/34*    (2006.01)
*B65G 69/08*    (2006.01)

(52) U.S. Cl.
CPC ............ *B65G 65/34* (2013.01); *B65G 69/08* (2013.01)

(58) Field of Classification Search
CPC ........ B65G 65/34; B65G 69/08; B65G 21/12; B65G 39/025; B65G 47/53; B65G 65/23
See application file for complete search history.

(56) References Cited

U.S. PATENT DOCUMENTS

| 2,756,883 A * | 7/1956 | Schreck ................ B65G 65/23 254/31 |
| 2,822,113 A * | 2/1958 | Joiner, Jr. ............. B65G 65/23 222/173 |

(Continued)

FOREIGN PATENT DOCUMENTS

| WO | WO-0123286 A1 * | 4/2001 | ............. B65G 65/23 |
| WO | WO-2020176706 A1 * | 9/2020 | ........... B65B 69/005 |

OTHER PUBLICATIONS

PCT Search Report and Written Opinion, mailed Dec. 4, 2024, received in corresponding PCT Application No. PCT/US2024/037731, 20 pages.

*Primary Examiner* — Donnell A Long
(74) *Attorney, Agent, or Firm* — Grossman, Tucker, Perreault & Pfleger, PLLC

(57) ABSTRACT

An apparatus for emptying the contents of a container. The apparatus may include a base and a lift coupled to the base and movable between a loading position and emptying position. In some embodiments, the apparatus may include a lift actuator including a lift piston configured to move the lift from the loading position to an intermediate position and a rotation piston for moving the lift from the intermediate position to the emptying position. In some embodiments, the apparatus includes a frame, a platform, a mast, and a bale. The bale is slidably disposed on the mast for selectively adjusting the distance between the bale and the platform. In some embodiments, a lift may be provided with an agitator to release interlocked packages and allow them to empty from a container in an emptying position. The agitator may include an airbag and a spring pack on opposite sides of the platform.

15 Claims, 22 Drawing Sheets

(56) References Cited

U.S. PATENT DOCUMENTS

| | | | | |
|---|---|---|---|---|
| 2,844,264 A | * | 7/1958 | Stirm | B65G 65/23 |
| | | | | 108/6 |
| 3,137,402 A | * | 6/1964 | Gunn, Jr. | B65G 65/23 |
| | | | | 222/165 |
| 3,198,395 A | * | 8/1965 | Mckinney | B65D 88/56 |
| | | | | 222/460 |
| 3,200,974 A | * | 8/1965 | Ciraolo | B65G 65/23 |
| | | | | 414/421 |
| 3,347,399 A | * | 10/1967 | Ensinger | B65G 65/23 |
| | | | | 108/6 |
| 4,989,917 A | | 2/1991 | Schmidt, Jr. | |
| 5,302,073 A | * | 4/1994 | Riemersma | B65G 65/23 |
| | | | | 414/292 |
| 5,513,937 A | | 5/1996 | Huntoon et al. | |
| 5,601,014 A | * | 2/1997 | Stevens | B66F 7/08 |
| | | | | 108/9 |
| 5,865,590 A | * | 2/1999 | Lilley | B65G 65/23 |
| | | | | 414/420 |
| 2001/0012482 A1 | * | 8/2001 | Vezina | B65G 59/08 |
| | | | | 414/419 |
| 2009/0301357 A1 | | 12/2009 | Fourney et al. | |
| 2011/0229292 A1 | * | 9/2011 | Applewhite | B65F 1/1452 |
| | | | | 414/404 |
| 2016/0096653 A1 | * | 4/2016 | Stratton | B07C 3/008 |
| | | | | 414/800 |
| 2022/0055845 A1 | | 2/2022 | Lustig | |

\* cited by examiner

CONTAINER UNLOADING APPARATUS AND METHOD FOR CONTROLLING THE SAME

CROSS-REFERENCE TO RELATED APPLICATIONS

The present application claims the benefit of the filing date of U.S. Provisional Application Ser. No. 63/526,587, filed Jul. 13, 2023 and U.S. Provisional Application Ser. No. 63/607,182, filed Dec. 7, 2023, the entire teachings of which applications are hereby incorporated herein by reference.

TECHNICAL FIELD

The technical field relates management of containers and, more specifically, to a container unloading apparatus and a method of controlling the same.

BACKGROUND INFORMATION

Containers are often used in industrial applications to manage large amounts of items. These containers are often filled with like pieces such as, for example, manufactured parts, raw materials, mail, goods, etc. Because these containers are heavy and unwieldy, loaders and unloaders are often specialized to facilitate loading and unloading of the containers.

BRIEF DESCRIPTION OF THE DRAWINGS

Objects, features, and advantages disclosed herein will be apparent from the following description of particular embodiments, as illustrated in the accompanying drawings in which like reference characters/descriptions refer to the same parts throughout the different views. The drawings are not necessarily to scale, emphasis instead being placed upon illustrating the principles disclosed herein. For purposes of clarity, not every component may be labeled in every drawing.

DETAILED DESCRIPTION

Figure 1A:
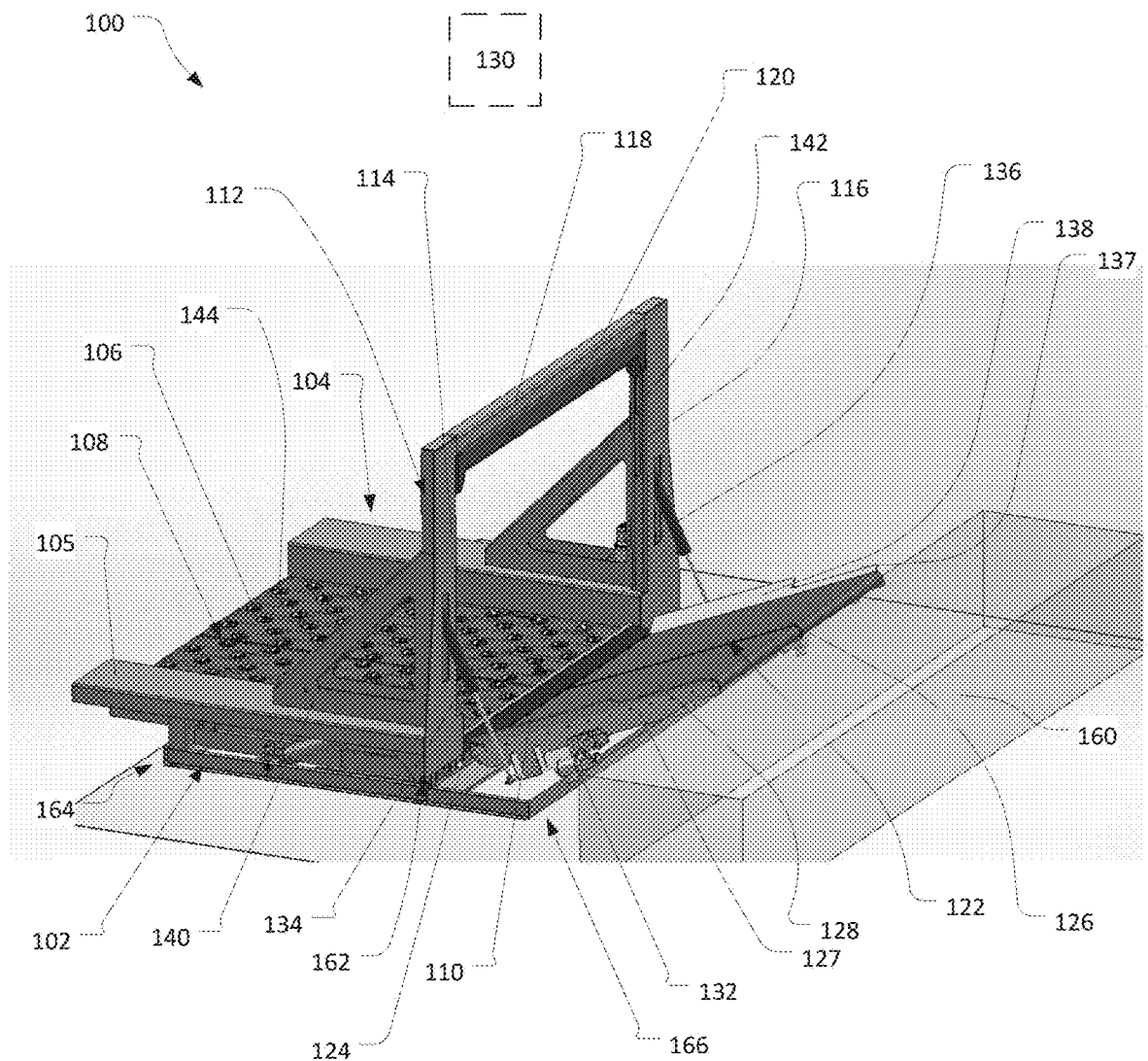
FIG. 1A is an isometric view of one example embodiment of a container unloading apparatus consistent with the present disclosure including a door in an open position and a lift in a loading position.

The present disclosure is not limited in its application to the details of construction and the arrangement of components set forth in the following description or illustrated in the drawings. The examples described herein may be capable of other embodiments and of being practiced or being carried out in various ways. Also, the phraseology and terminology used herein is for the purpose of description and should not be regarded as limiting as such may be understood by one of skill in the art. Throughout the present description, like reference characters may indicate like structure throughout the several views, and such structure need not be separately discussed. Furthermore, any particular feature(s) of a particular exemplary embodiment may be equally applied to any other exemplary embodiment(s) of this specification as suitable. In other words, features between the various exemplary embodiments described herein are interchangeable, and not exclusive.

An apparatus for emptying the contents of a container consistent with embodiments of the present disclosure may include a base and a lift pivotally coupled to the base configured to unload the contents of the container. The lift may include a platform configured to support the container and a mast adjacent to the platform. In some embodiments, a bale may be coupled to the mast. In some embodiments, the system may include a door, which may include one or more of a conveyor, sidewall, or mast guard. In some embodiments, the system comprises an agitator configured to agitate a container to facilitate the emptying of the contents of the container. In some embodiments, the system may include a lift riser coupled to the lift configured to raise the lift and a container to facilitate emptying contents of a container onto a raised receiving platform, such as for example, a conveyor. In some embodiments, the apparatus may include a lift actuator including a lift piston configured to move the lift from a loading position to an intermediate position and a rotation piston for moving the lift from the intermediate position to the emptying position.

FIGS. 1A-1G illustrate one example of a system 100 and one example of a process for emptying a container 131a consistent with the present disclosure. In general, the illustrated system includes a base 102, a lift 104, a door 122 and a controller 130. The lift 104 includes a frame 105, a platform 106 supported by the frame 105, a mast 112 and a bale 120. The lift 104 is pivotally coupled to the base 102 for movement between a loading position, shown for example in FIGS. 1A and 1B and an emptying position, shown for example in FIG. 1E. The platform 106 has a first end 108 and a second 110 end, and the mast extends upwardly from the frame 105 adjacent the second end 110 of the platform 106. The mast 112 includes first 114 and second 116 rails and a header 118. In the illustrated example embodiment, the bale 120 is disposed between the first and second rails 114, 116 such that the bale 120 slidably adjustable along the rails 114, 116 and relative to the platform 106. The door 122 is pivotally coupled to the lift 104 for movement between a closed position, shown for example in FIGS. 1C and 1D, and an open position, shown for example in FIGS. 1A, 1B and 1F.

The controller 130 may be coupled to the system 100 through a wired or wireless connection to provide control signals for energizing one or more associated motors, hydraulic pistons or pneumatic pistons to cause the lift 104 to pivot relative to the base 102 to transition between the loading position and the emptying position and/or for causing the door 122 pivot relative to the lift 104 to transition between the open and the closed position. The controller 130 may provide the control signals to the system 100 autonomously, or in response, at least in part, to operator input.

The base 102 is a rigid structure, e.g., formed from metallic components, with a bottom configured to lay flat on a floor surface. The base 102 may be fixedly attached to a portion of the ground surface (i.e., the base 102 may be bolted to a floor). In some embodiments, the base 102 may be removably positioned on the ground or floor surface to allow for portability of the system 100. In the illustrated embodiment, the base is generally rectangular and has a first end 164 and a second 166 end. The frame 105 is pivotally coupled to the base at a pivot point 162 positioned between the first end 164 and the second end 166. In some embodiments, for example, the pivot point may be positioned between about 20-40% of length of the base from the second end 166. Because the container 131a may be heavy, providing the pivot point 162 between the first and second ends of the base 102 prevents tipping of the system 100 when the container 131a is in, for example, the emptying position.

Figure 1B:
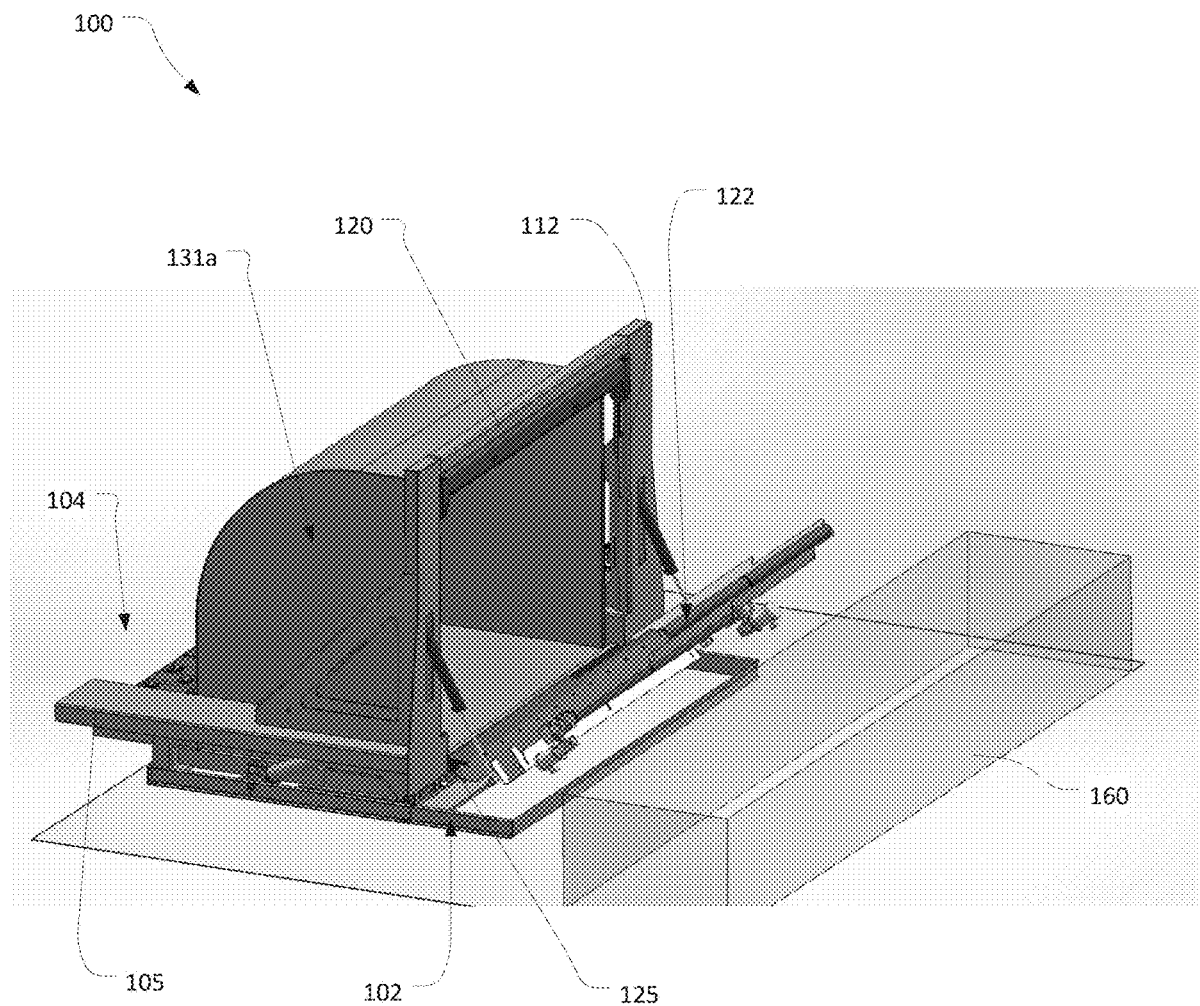
FIG. 1B is an isometric view of the container unloading apparatus shown in FIG. 1A supporting a Unit Loading Device (ULD) with the door transitioning from an open position to a closed position.
Figure 1C:
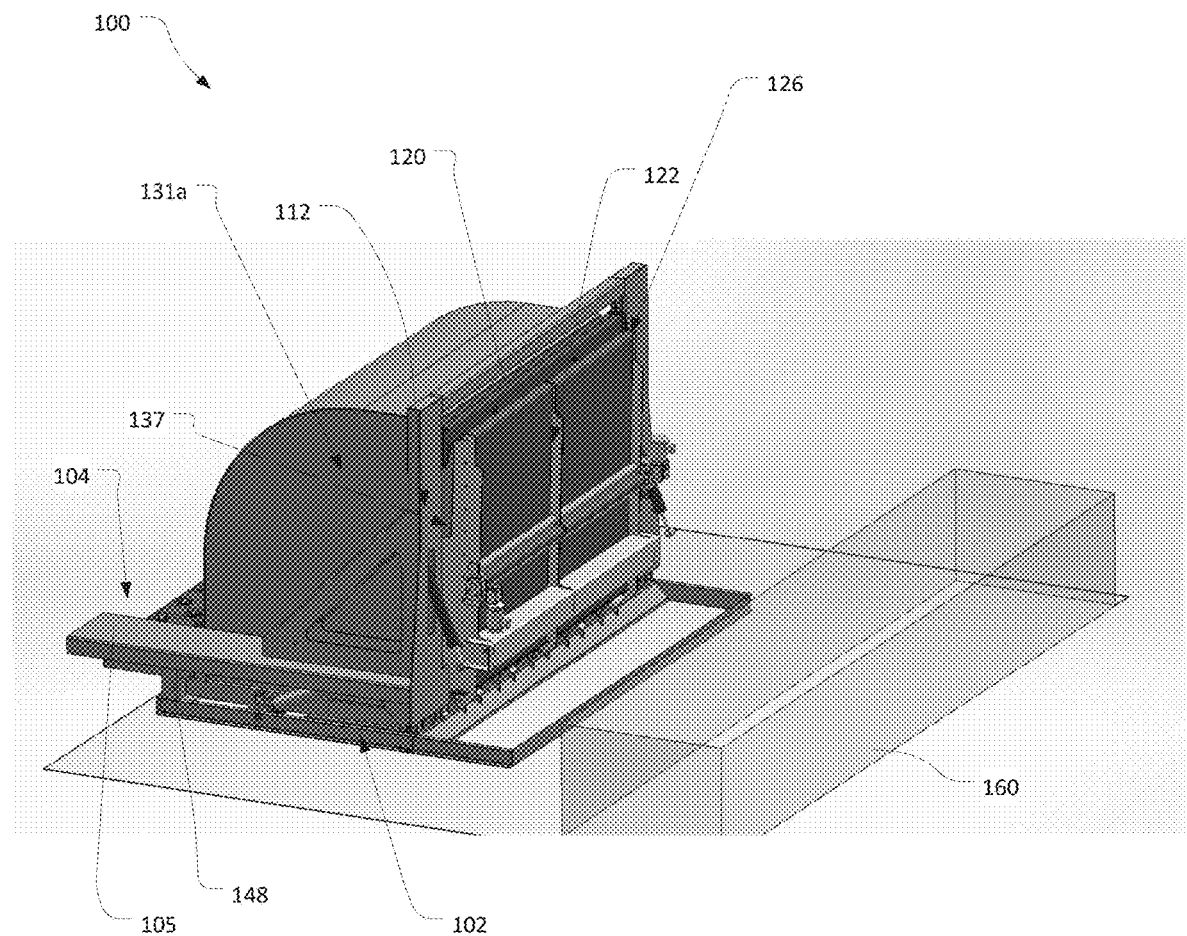
FIG. 1C is an isometric view of a container unloading apparatus shown in FIG. 1A, wherein the door is in a closed position.
Figure 1D:
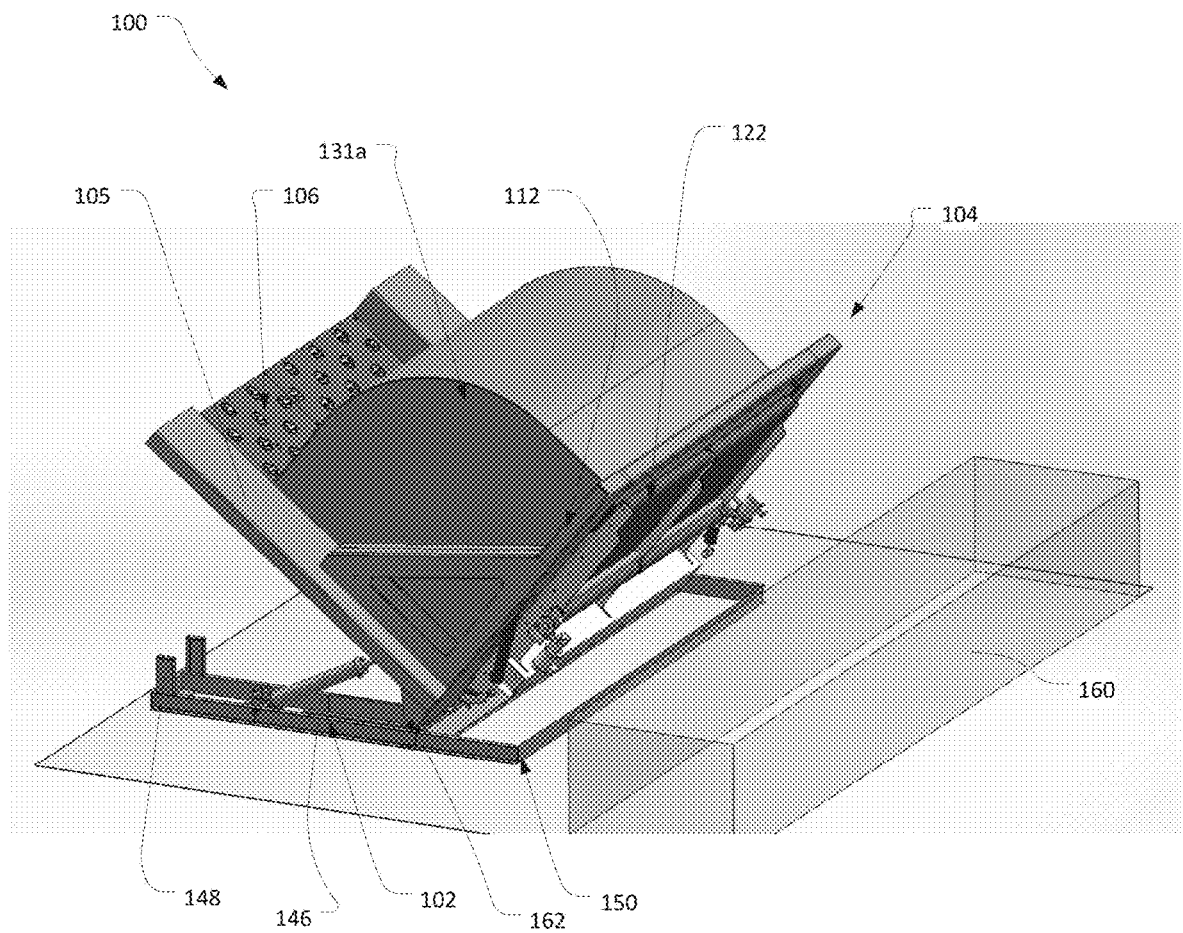
FIG. 1D is an isometric view of a container unloading apparatus shown in FIG. 1A, wherein the lift is transitioning to an emptying position and the door is in a closed position.

With reference to FIG. 1D, for example, in the illustrated example embodiment a first lift piston 146 and a second lift piston (not shown) are coupled, e.g., by associated clevis joints, between a top of the base 102 and a bottom of the frame 105 of the lift 104. The first and second lift pistons 146 may be extended or retracted, e.g., in response to control signals from the controller 130, to pivot the lift 104 about the pivot point 162 to move the lift 104 between the loading and emptying positions. The first and second lift pistons 146 may be hydraulic or pneumatic pistons. In addition, or alternatively, the first and/or second lift pistons 146 may be replaced by one or more motors coupled to the pivot point 162, and/or by mechanical systems, such as a ball screw drive or other system torsionally acting on the pivot 162, as appropriate for the application.

As shown in FIGS. 1C and 1D, the base 102 may also include a frame indexing system including a first 148 and second (not shown) frame index. The frame indices may be coupled to the base 102 (such as fixedly coupled). The frame indices 148 may be configured to guide the frame 105 of the lift 104 into a desired position relative to the base 102. For example, when the lift 104 is lowered to the loading position, the frame indices 148 may receive and guide the frame 105 of the lift 104 into the loading position. The frame indices 148 may also structurally support the frame 105 of the lift 104 when the lift 104 is in the loading position. For example, the frame indices 148 may support a portion of the weight of the container 131a during the loading process. The frame indices 148 may relieve sustained stress that would otherwise be borne by the lift pistons 146. The frame indices 148 may also be configured to provide rotation support for the lift 104 wherein if the lift 104 is subject to torsional stress about the second end 110 of the platform 106, e.g., the frame indices 148 may mitigate the stress thereby protecting other components from damage.

In the illustrated example embodiment, the platform 106 includes a series of rollers 144. The rollers 144 may be in the form of cylindrical rollers, ball bearings, omni-direction wheels, etc. The rollers 144 are configured to facilitate loading of a container 131a whereby the container 131a is placed onto the first end 108 of the platform 106 and rolled on the rollers 131 toward the second end 110. Each roller may be positioned on an axis for passive rotation about the axis, or one or more of the rollers may be driven for rotation about the axis, e.g., by one or more motors, to actively drive the container toward the second end 110. In operation, the movement of the container 131a may be stopped at the second end 110 when it abuts a portion of the mast 112 or bale 120. Although not shown, the platform 106 may include flat surface without wheels or a rail system, wherein a container 131a is configured to slide across the platform 106. This embodiment may also facilitate a container 131a including wheels. In some embodiments, the platform 106 may be configured as an air deck, wherein multiple jets of air are generated by one or more associated motors and directed upwardly from the top surface of the platform 106. The container 131 may be supported above the top surface of the platform 106 by the air jets, allowing an operator to easily move the container toward the second end 110.

The mast 112 is fixedly coupled to the frame 105 of the lift 104 and extends upwardly relative to the frame 105 and the platform 106 proximate the second end 110 of the platform 106. The mast 112 may be formed of the same material of the lift 104 (steel, aluminum, etc.). The pivotal connection between the lift 104 and the base 102 may be provided by fixed connection between the mast 112 and the base 102 at the pivot point 162.

The mast 112 may be further supported by a first mast support 140 and a second mast support 142. The first mast support 140 and the second mast support 142 may be triangular in shape, such as shown in FIGS. 1A-1G, but may be in the form of any regular or irregular shape. The first and second mast supports 140, 142 are coupled to a portion of the mast 112 and a portion of the frame 105 in order to reinforce the connection of the mast 112 and frame 105 during the container 131*a* emptying process.

The header 118 of the mast extends horizontally between the first 114 and second 116 rails, which extend upwardly from the frame 105 and relative to the platform 106. The first 114 and second 116 rails and/or the header 118 may be positioned to engage a container 131*a* of a particular size to prevent the container from falling off the second end 110 of the platform 106 when the lift is in the emptying position. In addition, or alternatively, the bale 120 is positioned between the side rails 114, 116 and between the header 118 and the platform 1106 and is configured to slide along the first and second rails 114,116 of the mast 112. The bale 120 may slidably adjust along the first and second rails 114, 116 to different heights above the platform 106 to engage containers of differing dimensions. Movement of the bale 120 may be restricted by a mechanical stop on one or more of the rails proximate the platform 106 or container 131*a* and/or by the header 118. Although the illustrated example embodiment includes both the bale 120 and the header 118, it is to be understood that a system consistent with the present disclosure may include a bale 120 without a header, e.g., the bale may be configured to stop sliding movement adjacent the tops of the first and second rails 114, 116.

In response to control signals from the controller 130, the bale 120 may raise, lower, or maintain a position. In operation, the bale 120 may move simultaneous to one or more components of the system 100. For example, the bale 120 may move to engage or disengage from a container 131*a* at the same time as the door 122 is moved to the open or closed position. This may expedite operation of the system 100 wherein the bale 120 is lowered to a desirable height to interface with the container 131*a* while the door 122 is closed. This may allow the system 100 to empty the contents of the container 131*a* faster than if either were operated in succession. Once the height of the bale 120 is adjusted to interface with the container 131*a*, the bale 120 may remain stationary until the container 131*a* is removed from the platform 106. The height of the bale 120 may be returned to a neutral position after a container emptying process. For example, the bale 120 may abut the header 118 in a neutral position and may return to that position when the system 100 is in a loading position.

The door 122 has a bottom end 124 and a top end 126. The bottom end 124 of the door is pivotally coupled to the lift 104 adjacent the second end 110 of the platform 106 whereby the door 122 is configured to pivot relative to the mast 112 between the closed position and the open position.

In the illustrated example embodiment, the door 122 is be coupled to the mast 112 at a pivot point 125. First 134 and second 136 door pistons may be extended or retracted for rotating the door about the pivot point 125 for transitioning the door 122 to the open position and closed positions. In the illustrated example embodiment, each of the first and second door pistons 134, 136 are received into a portion of the mast 112. The connection of the first and second door pistons 134, 136 to the mast 112 may be free such that it is mechanically controlled by an operator, or it may be attached to a motor (not shown) such that extension and retraction of the first and second door pistons 134, 136 are controlled, such as by the controller 130. The first and second door pistons 134, 136 may be hydraulic, pneumatic pistons. In addition, or alternatively, the first and/or second door pistons 134, 136 may be replaced by one or more motors coupled to the pivot point 125, and/or by mechanical systems, such as a ball screw drive or other system torsionally acting on the pivot 125, as appropriate for the application. The first and second door pistons 134, 136 may receive control signals from the controller to move the door between the open position and the closed position and, in some instances, may operate simultaneously with the lift pistons 146 moving the lift 104 between the loading and emptying positions. For example, the first and second lift pistons 146 may transition the lift 104 into a loading position while the first and second door pistons 134, 136 transition the door 122 into an open position. Alternatively, the lift pistons 146 may operate while the first and second door pistons 134, 136 remain in stationary positions. For example, the first and second door pistons 134, 136 may keep the door 122 in a closed position as the lift pistons 146 move the lift to an emptying position.

In the illustrated example embodiment, the door 122 includes a conveyor 128, such as a conveyor belt, movably supported on a door frame 127. The conveyor is configured conveying items placed on an inside surface of the conveyor 128 from the bottom end 124 toward the top end 126 of the door 122 to move items away from the lift 104. In addition, or alternatively, the conveyor may be configured conveying items placed on an inside surface of the conveyor 128 from the top end 126 of the door 122 toward the bottom end 124 of the door 122 to move items toward the lift 104.

The door 122 includes a mast guard 138 configured to abut or engage a portion of the mast 112 to prevent damage to portion of the door 122 while in a closed position. The mast guard 138 may also confine emptied contents to a specific portion of the door 122, such as, for example, the conveyor 128. The dimensional area of the door 122, including the mast guard 138, may be configured to be the same or smaller than the dimensional area created by the height of the first and second rail 114, 116 multiplied by their distance apart. Said another way, the area between the header 118 to the second end 110 of the platform 106 and the distance from the first rail 114 to the second rail 116 may be larger than the height and width of the door 122. This feature may facilitate engagement of the door 122 with the container 131*a* and reduce the chance of inventory escaping from the door 122. For example, the mast guard 138 may be flared outward to direct inventory toward the door 122. In some embodiments, the mast guard includes a notch 137 at a top portion thereof extending downward a distance from the top of the mast guard corresponding to the distance of travel of the bale 120 with respect to the mast guard, as shown particularly in FIGS. 1A and 1C.

The loading and emptying positions of the lift 104 and the open and closed positions of the door 122 facilitate loading and emptying of a container 131*a*. In the loading position of the lift 104, as shown for example in FIG. 1B, the first end 108 of the platform 106 is positioned proximate the base 102 and the frame 105 may be in contact with the base 102. As best shown in FIGS. 1A-1B, when the lift 104 is in the loading position a container 131*a* may be loaded onto the platform 106 by sliding it from the first end 108 of the platform 106 toward the second end 110 of the platform 106. To transition from the loading position to the emptying position, shown for example in FIG. 1E, the lift 104 is rotated about the pivot point 162, e.g., the lift pistons 146 and in response to control signals from the controller 130. In the emptying position, the container 131*a* is retained on the platform, e.g., by contact with the rails 114, 116 and/or header 118 of the mast 122 and/or the bale 120 and is held in a partially inverted position to empty contents from an open end of the container 131*a*.

In the closed position of the door 122, as shown for example in FIG. 1C, the top end 126 of the door 122 is positioned adjacent the mast 112 and/or the bale 120. In some embodiments, in the closed position the door 122 may contact a portion of the mast 112 and/or the bale. In the open position of the door 122, as shown for example in FIG. 1G, the top end 126 of the door 122 is positioned away from the mast 112. In the open position, a portion of the door 122 may be configured to contact or engage with a separate apparatus. For example, a bottom of the door frame 127 at the top end 126 of the door 122 may be proximate, or may contact, a separate item receiver 160, e.g. a platform, conveyor and/or container for receiving items from the container 131, 131*a*, such that the conveyor 128 does not make physical contact with the item receiver 160. This may prevent drag of the conveyor 128 on the item receiver 160 and unnecessary wear on the conveyor. Items may be emptied from the lift 104 and onto/into the platform or container 166 by items dropping out of the container 131*a* when the lift 104 is in the emptying position and onto the conveyor 128 and being transported by the conveyor to the platform or container 166.

FIGS. 1C to 1G illustrate one example of a sequence of movements of the lift 104 from the loading and emptying positions and the door 122 from the closed and open positions for emptying items from a container consistent with an embodiment of the present disclosure. In embodiments such as the one shown in FIG. 1C, the lift 104 may remain in the loading position while the door 122 is transitioning into the closed position. In FIG. 1C, the lift 104 is in a loading position, and the door 122 is in a closed position, and a container 131*a* has been loaded onto the platform 106 with an open end of the container in opposed facing relationship to an inside of the door 122. As shown in FIG. 1D, in response to control signals from the controller, the lift pistons 146 may transition the lift 104 from the loading position to the emptying position by rotating the lift 104 about the pivot point 162 such that the container 131*a* is rotated about an edge. The controller may cease rotation of the lift when the lift pistons reach an end-of-stroke or when a desired angle of the mast to the base, e.g., 125-155 degrees, is achieved. During the transition from the loading position to the emptying position, the door 122 may remain in a closed position.

Figure 1E:
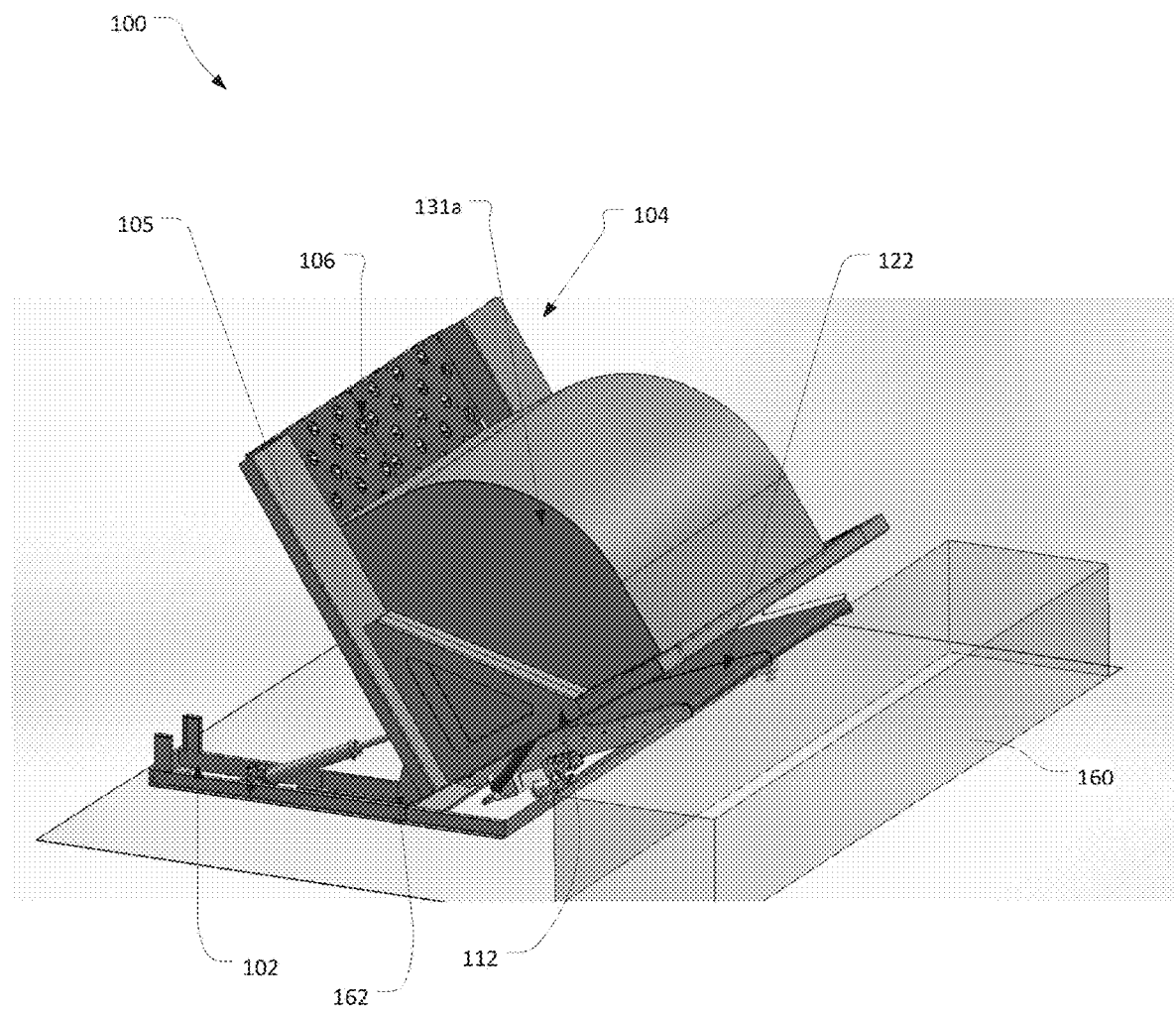
FIG. 1E is an isometric view of a container unloading apparatus shown in FIG. 1A, wherein the door is transitioning to an open position from a closed position and the lift is transitioning to the emptying position.

As shown in FIG. 1E, in response to control signals from the controller 130 the lift 104 may remain in an emptying position while the door pistons 134, 146 move to the door to the open position. The door 122 may continue to rotate until, for example, the frame 127 of the door 122 contacts the item receiver 160.

Figure 1F:
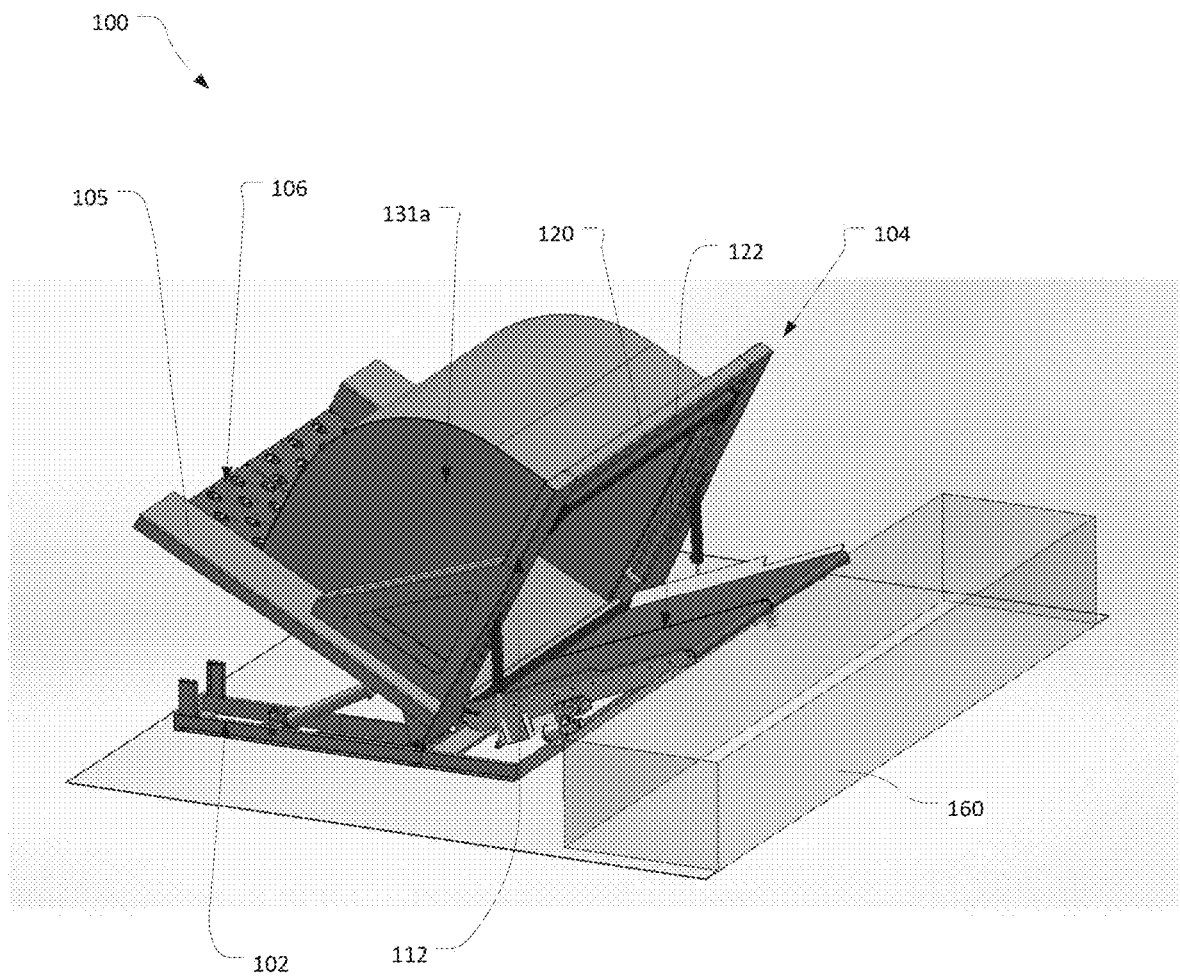
FIG. 1F is an isometric view of a container unloading apparatus shown in FIG. 1A, wherein the door is in an open position and the lift is transitioning back to a loading position.
Figure 1G:
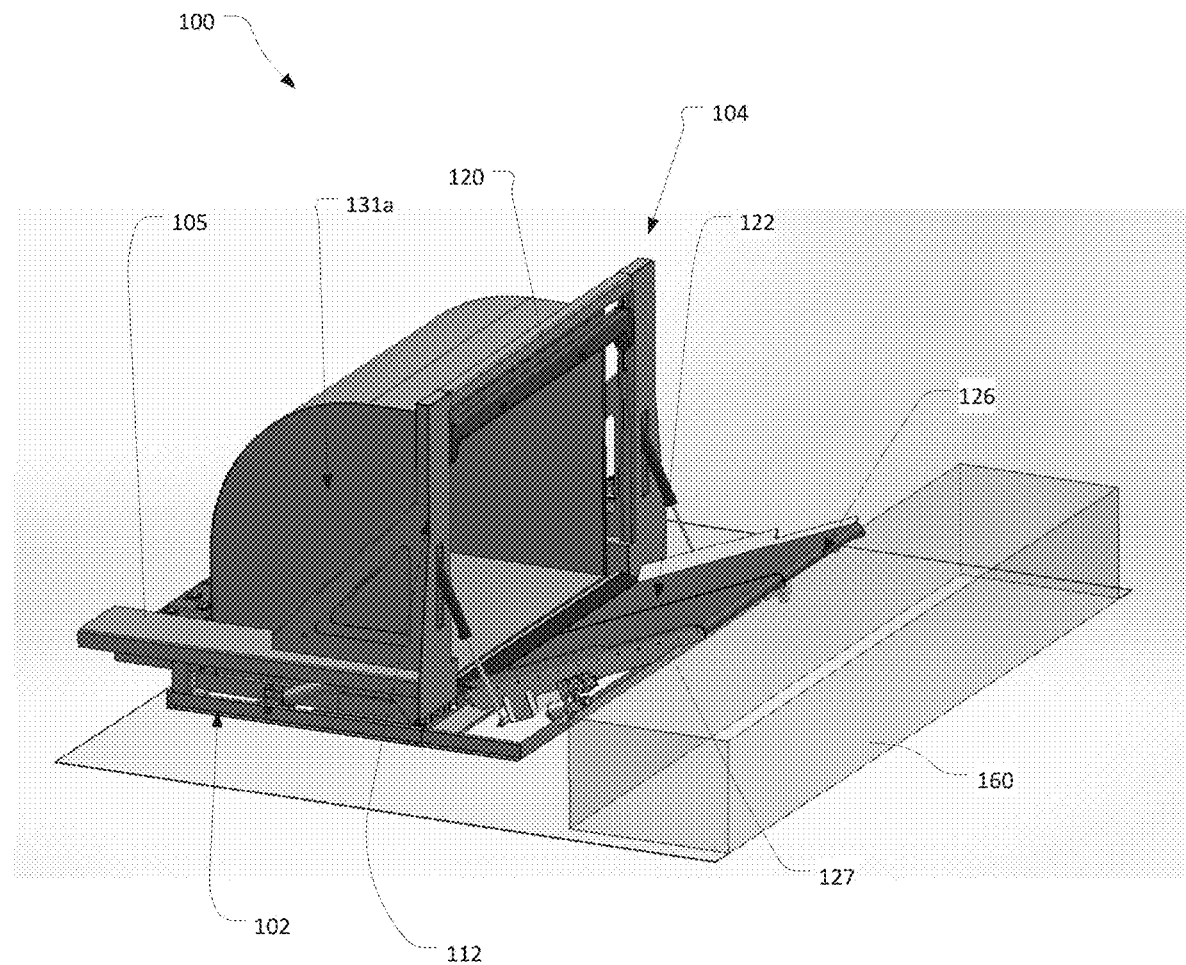
FIG. 1G is an isometric view of a container unloading apparatus shown in FIG. 1A, wherein the lift is in a loading position and the door is in an open position.

FIG. 1F depicts one example of an emptying position of the lift 104 with the door 122 in the open position. In this position, items from the container 131*a* may fall by force of gravity onto the conveyor 128. In response to control signals from the controller 130, the lift 104 may remain stationary and the conveyor 128 may be energized to transfer the emptied items onto/into the item receiver 160. In some embodiments, the controller 130 may alternate between raising and lowering the lift 104 to empty the contents of the container 131*a*. When the container 131*a* is emptied, the controller 130 may instruct the lift 104 to return to the loading position, as shown in FIG. 1G, and the container 131*a* may be removed from the platform 106.

Figure 2A:
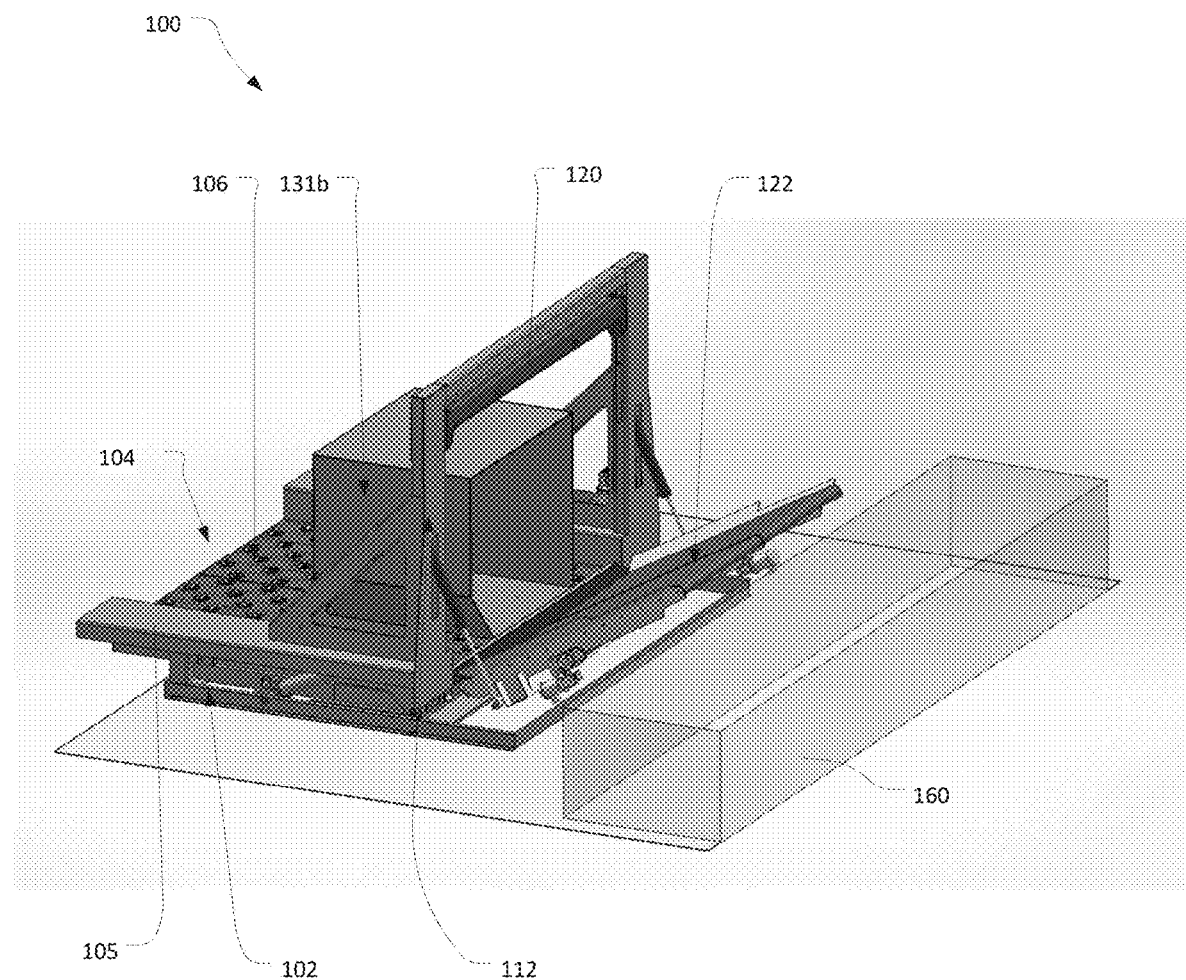
FIG. 2A is an isometric view of a container unloading apparatus shown in FIG. 1A, wherein a lift supports a smaller-sized ULD.
Figure 2B:
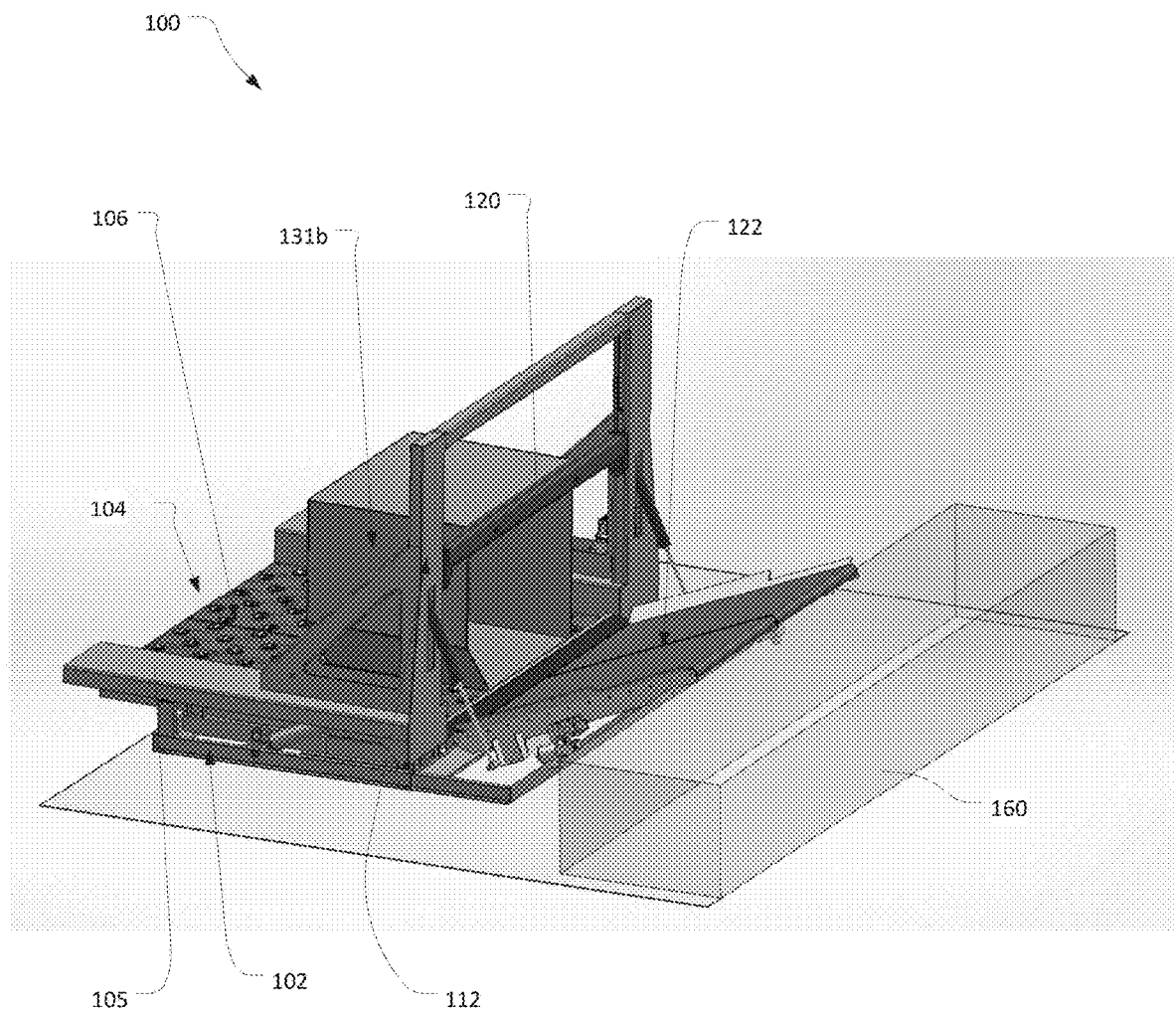
FIG. 2B is an isometric view of a container unloading apparatus shown in FIG. 1A, wherein the height of the bale is adjusted to facilitate engagement with the smaller size bale.

Advantageously, the bale 120 allows the system 100 to operate for emptying containers, e.g., ULDs, of a variety of different dimensions. Known ULDs have heights of, for example, 38 inches (in), 44.5 in, 51 in, 56 in, 57 in, 59 in, 62.4 in, 63 in, etc. As shown FIGS. 2A-2B, for emptying a smaller container 131*b*, in response to control signals from the controller the bale 120 may slide along the rails 114, 116 of the mast 112 from a neutral state adjacent a bottom of the header 118, shown in FIG. 2A, to an engaged state, shown in FIG. 2B, wherein the bale 120 contacts a top of the container 131*b*. Transition of the lift 104 from the loading position to the emptying position and the door 122 from the open position to the closed position may be as described above in connection with FIGS. 1A-G. During the transition, the bale 120 may bear retain the container 131*b* on the lift 104.

A system consistent with the present disclosure may be provided in a variety of configurations. FIGS. 3A-3F, for example, illustrate a system 100*a* consistent with the present disclosure including a first sidewall 302, a second sidewall 304, a lift riser 306, and a controller 130. Although FIGS. 3A-3F illustrate the system as including both the sidewalls 302, 304 and the lift riser 306, it is to be understood the sidewalls 302, 304 or lift riser 306 may be incorporated into any system consistent with the present disclosure. Also, one or more other features, e.g., the bale 120, of system 100 may be incorporated into the system 100*a* or any other system consistent with the present disclosure.

Figure 3A:
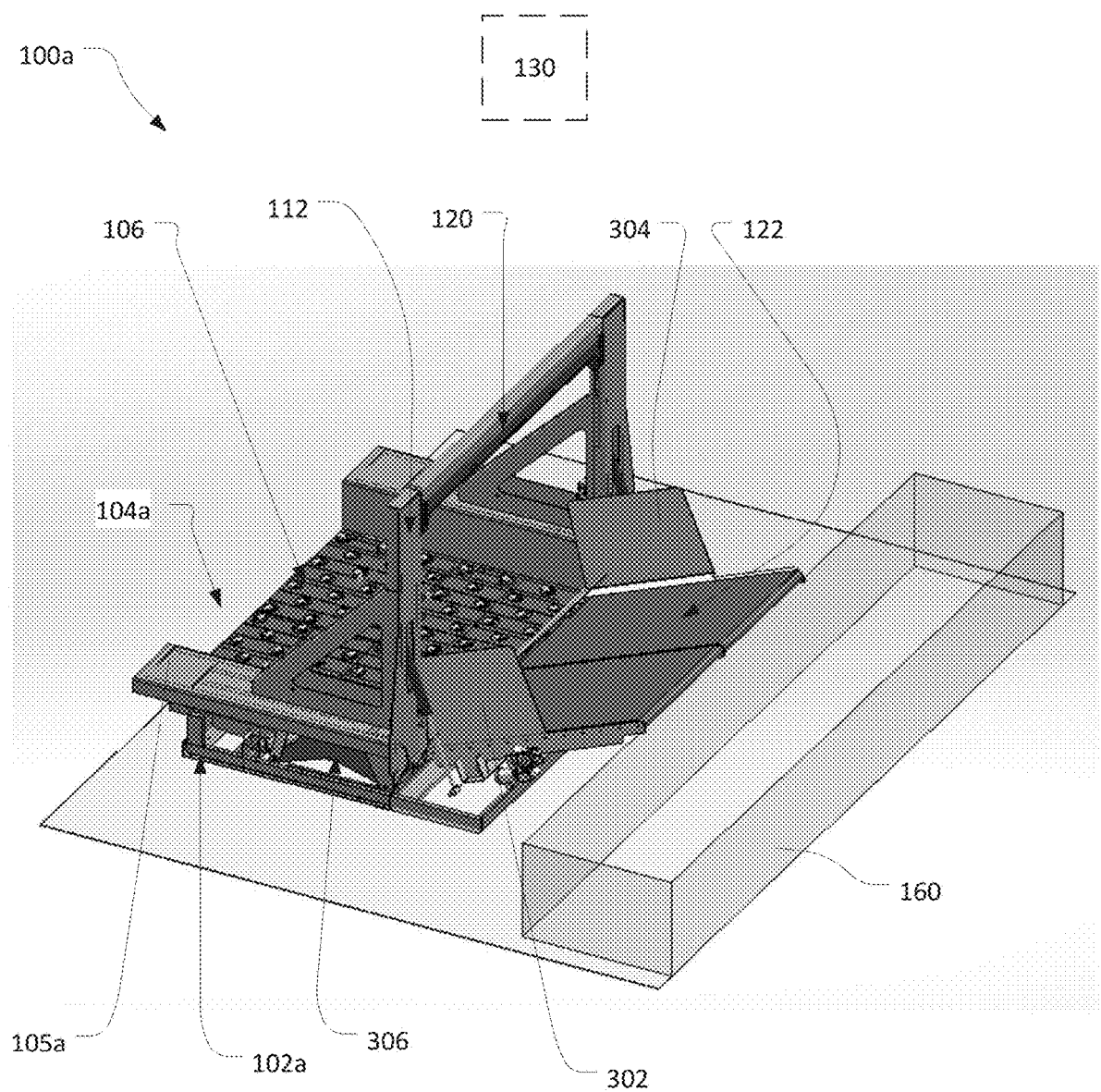
FIG. 3A is an isometric view of another example embodiment of a container unloading apparatus consistent with the present disclosure having a door including sidewalls and a lift riser, consistent with another embodiment of the present disclosure.
Figure 3B:
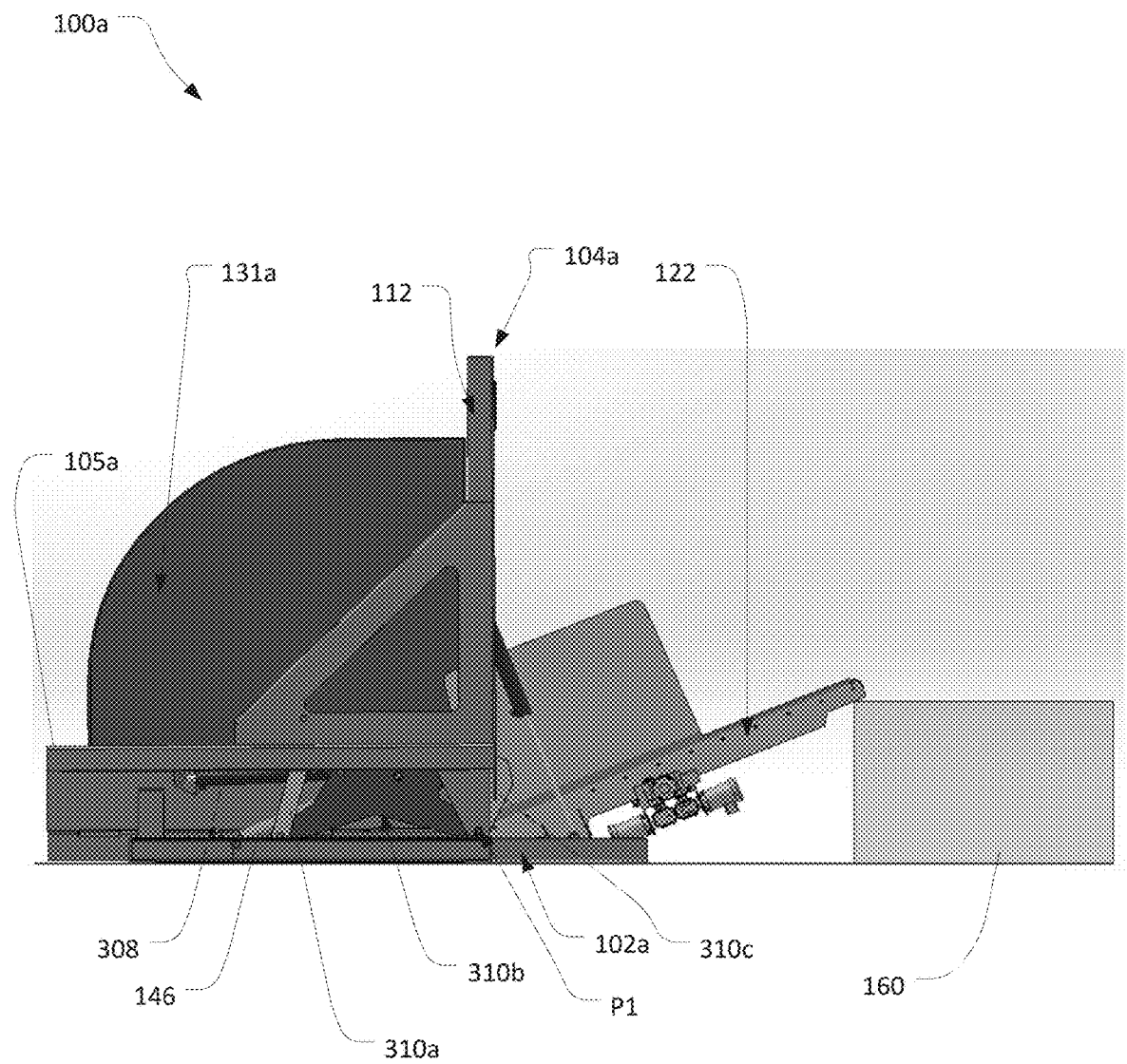
FIG. 3B is a side view of the container unloading apparatus shown in FIG. 3A, wherein the platform supports a ULD.
Figure 3C:
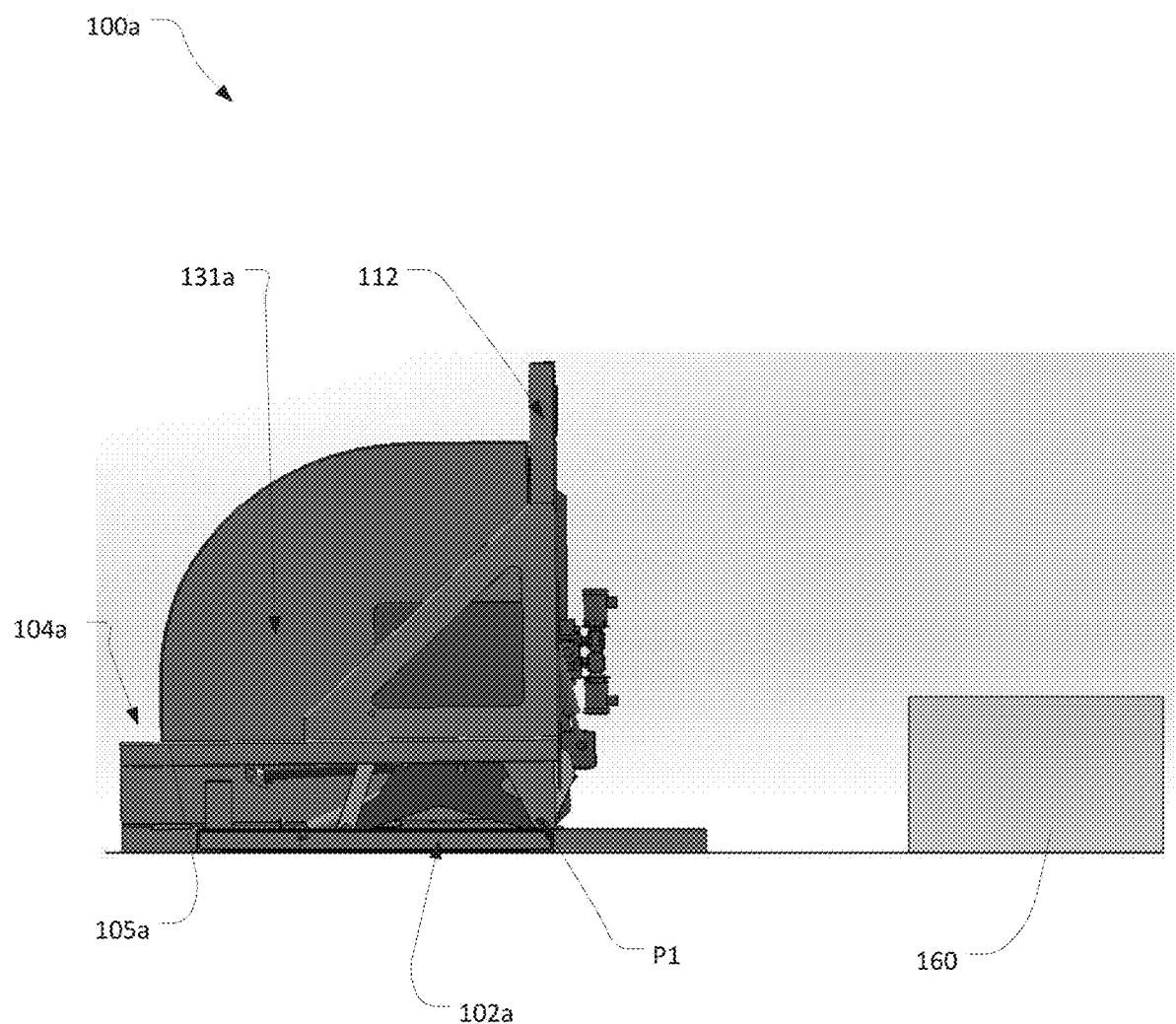
FIG. 3C is a side view of the container unloading apparatus shown in FIG. 3A, wherein the door is in a closed position and the lift remains in a loading position.

In the example embodiment shown in FIGS. 3A-3F, the door 122 may include the first and second sidewall 302, 304 extending inwardly toward the lift 104*a* from opposite sides of the door and disposed between the top and bottom end 126, 124 of the door 122. The sidewalls 302, 304 may each include a singular piece material such as plastic, sheet metal, etc. The sidewalls 302, 304 may be mechanically fastened to the door 122. The sidewalls 302, 304 may be configured to fit between the first rail 114 and second rails 116 of the mast 112 when the door 122 is in a closed position as shown in FIG. 3C. As further depicted in FIG. 3C, the sidewalls 302, 304 may also be configured such that when the door 122 is transitioned into a closed position, the sidewalls 302, 304 do not contact the mast 112.

In the illustrated example embodiment 100*a*, the lift riser 306 is coupled to the base 102*a* and to the lift 104*a*. The lift riser 306 may include one or more lift riser pistons 308 and at least one arm arms, e.g. arms 310*a*, 310*b*. One or more lift pistons 146 are coupled, e.g., by associated clevis joints, between a top of the base 102*a* the lift riser 306. The illustrated example shows only one side of the apparatus 100*a*. Another lift riser 306 may be provided on the opposite side of the apparatus 100*a*, the description of which is omitted herein for ease of explanation.

Figure 3D:
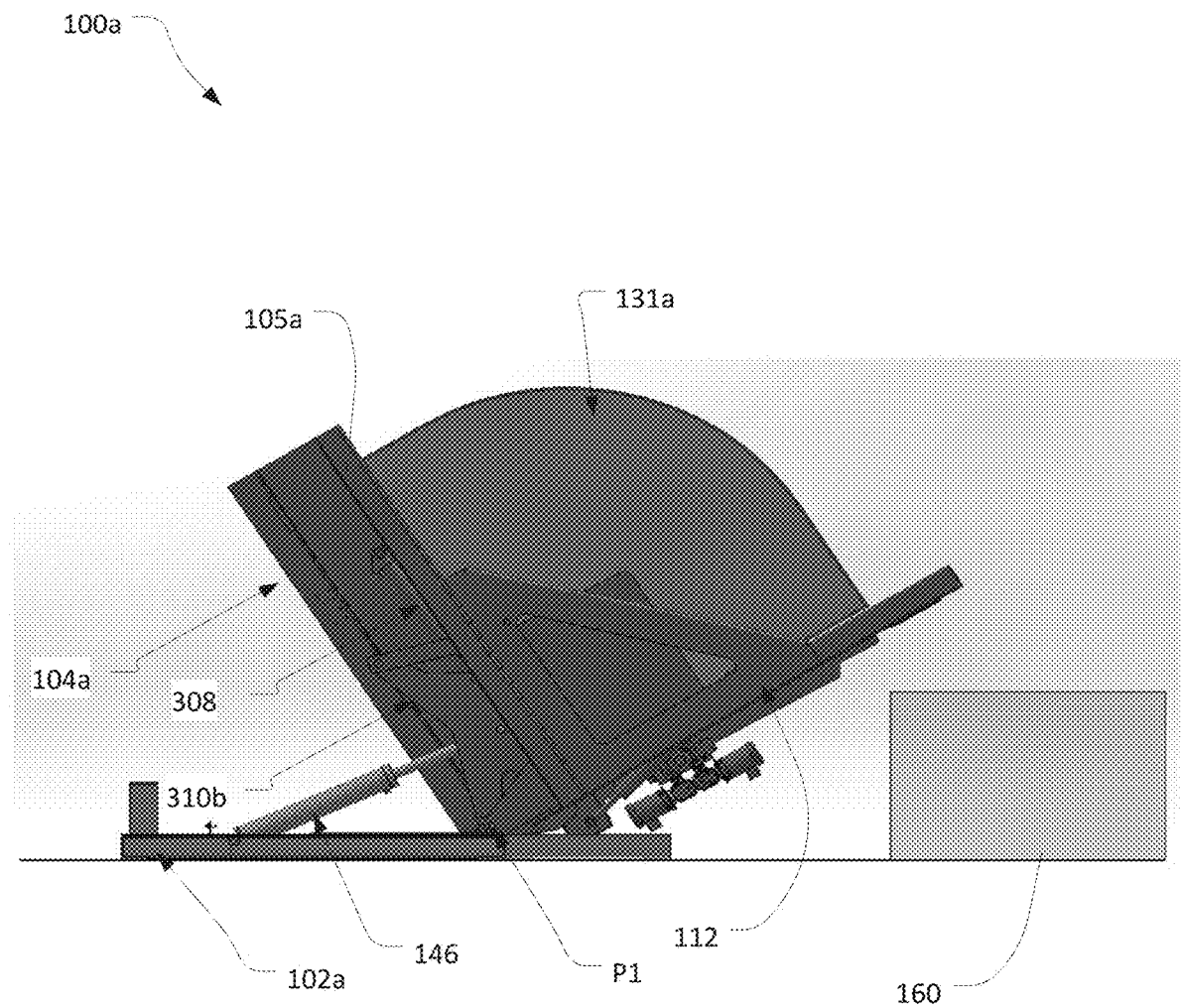
FIG. 3D is a side view of the container unloading apparatus shown in FIG. 3A, wherein the door is in a closed position and the lift is transitioned into an emptying position.
Figure 3E:
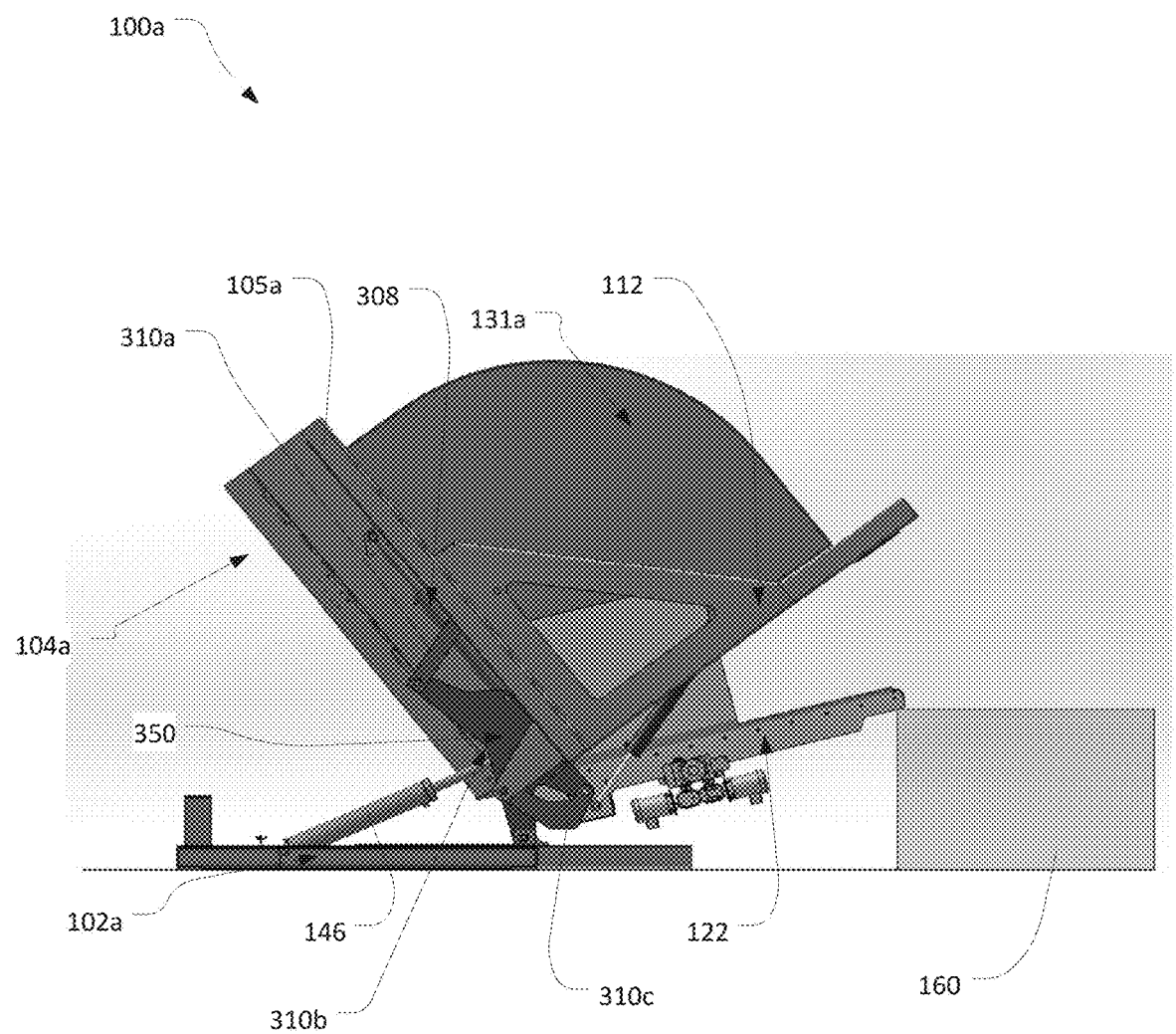
FIG. 3E is a side view of the container unloading apparatus shown in FIG. 3A, wherein the riser is further transitioning the lift from a low position to a high position.
Figure 3F:
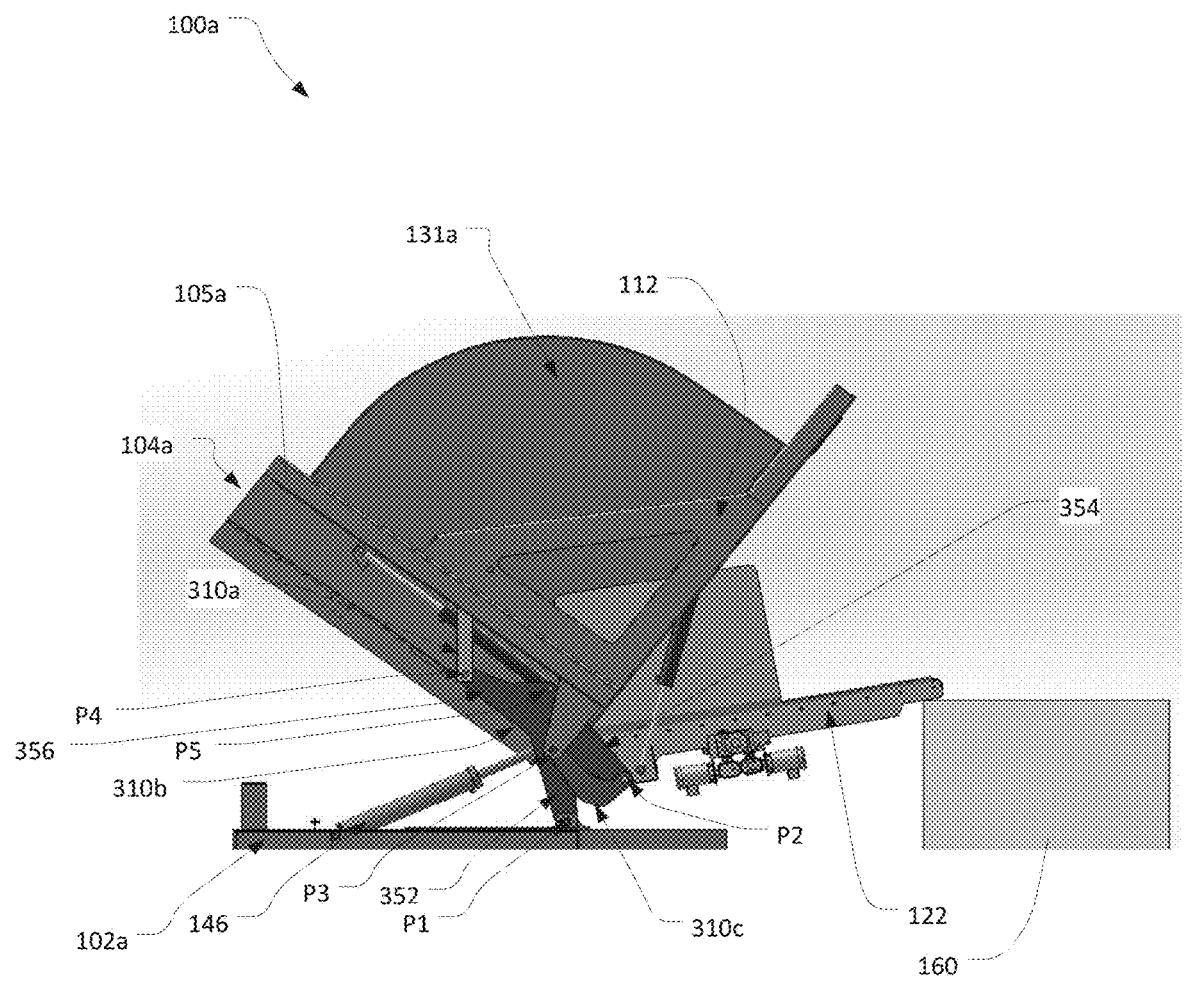
FIG. 3F is a side view of the container unloading apparatus shown in FIG. 3A, wherein the riser is in a high position.

In general, the lift 104 is movable between a loading position shown in FIG. 3A for receiving a container and an emptying position shown in FIG. 3F for emptying the container. The lift riser 306 is pivotally coupled between the base 102*a* and the lift 104*a*. A main arm 310*b* of the lift riser is coupled to the lift 104*a* and pivotally coupled to the base 102*a* at a pivot point. The lift piston(s) is pivotally coupled to the base 102*a* and the main arm 310*b* and configured to rotate the lift 104*a* and the main arm 310*b* about the pivot point. At least one lift riser piston 308 is coupled to the lift 104*a* and to the main arm 310*b*. The lift riser piston 308 is configured to rotate the lift 104a relative to the main arm 310b to raise the lift 104a from a low position to a raised position.

The one or more lift riser arms 310a, 310b, 310c may be configured to bear the load of the lift 104a and the container 131a, 131b, 131c and be configured to raise the lift 104a in response to extension of the one or more pistons, for example the lift pistons 146 and the lift riser piston 308. The lift pistons 146 and the lift riser pistons 308 may be hydraulic or pneumatic pistons. In addition, or alternatively, the lift pistons 146 and/or the lift riser pistons 308 may be replaced by one or more motors coupled, and/or by mechanical systems, such as a ball screw drive or other torsionally acting system, as appropriate for the application.

The lift riser may be provided in a variety of configurations. In the illustrated example embodiment, the lift riser arms include a connector arm 310a, a main arm 310b, and a lift arm 310c. With reference for example to FIGS. 3E and 3F, the main arm 310b couples the base 102a to the frame 105a of lift 104a. As shown, the main arm 310b has a central portion 350 and a first forwardly projecting extension 352 pivotally coupled to the base 102a at a first pivot point P1. A second forwardly projecting extension 354 of the main arm 310b is pivotally coupled to a first end of the lift arm 310c at a pivot point P2 and a second end of the lift arm 310c is pivotally coupled to the lift 104a at a pivot point P3. The lift arm 310c may be generally U-shaped. The connector arm 310a has a first end pivotally coupled to a rearwardly projecting extension 356 of the main arm 310b at a pivot point P4 and a second end of the connector arm 310a is coupled to the lift 104a. The lift pistons 146 are pivotally coupled to the base 102a and to the main arm 310b, and the lift riser piston 308 is coupled between the lift 104a and a pivot point P5 adjacent top of the central portion 350 of the main arm 310b The lift riser 306 may have one or more positions. For example, the lift riser 306 and the lift 104a in this embodiment includes a low position wherein the lift riser pistons 308 are retracted (as shown in FIG. 3D) and a raised position wherein the lift riser pistons 308 are extended (as shown in FIG. 3F). The one or more lift riser arms 310a, 310b, 310c may be coupled to the lift 104a in multiple locations such that the linear motion of one or more pistons is translated into a rotational movement. One or more of the lift riser arms 310a, 310b, 310c may also be configured to mitigate the forces received by one or more pistons from the weight of the lift 104a and the container 131a, 131b, 131c.

The controller 130 is configured to transition the lift 104a from the loading position to the emptying position and transition the door 122 from the open position to a closed position as described above and shown in FIGS. 3A-3F. As depicted in FIGS. 3C-3D, the controller 130 is configured to extend the lift piston 146 to rotate the main arm 310b and the lift 104a about the pivot point P1. As depicted in FIGS. 3E-3F, the controller 130 is configured to transition the lift riser 306 from a low position to a raised position by extending the lift riser piston 308 to rotate the lift arm 310c about the pivot point P2 and the lift about upward about the pivot point P3, while the connector arm rotates about pivot point P5. If the bottom end 124 of the door 122 is lower than the top end 126 of the door 122 when the door 122 is in an open position or the receiving platform 106 is higher than the bottom end 124 of the door 122, the controller 130 may instruct the lift riser 306 to raise the lift 104a by extending the lift riser piston 308. The lift riser 306 may be configured to raise the lift 104a such that the bottom end 124 of the door 122 is at or above the same horizontal level (height from the ground) as the receiving platform 106. In instances where the lift riser 306 is unable to raise the bottom end 124 of the door 122 such that it is at the same horizontal level as the receiving platform 106, lift riser 306 may still be engaged to reduce the angle of the open door 122. The reduced angle of the door 122 may facilitate emptying of the contents of the container 131a, 131b, 131c.

Figure 4A:
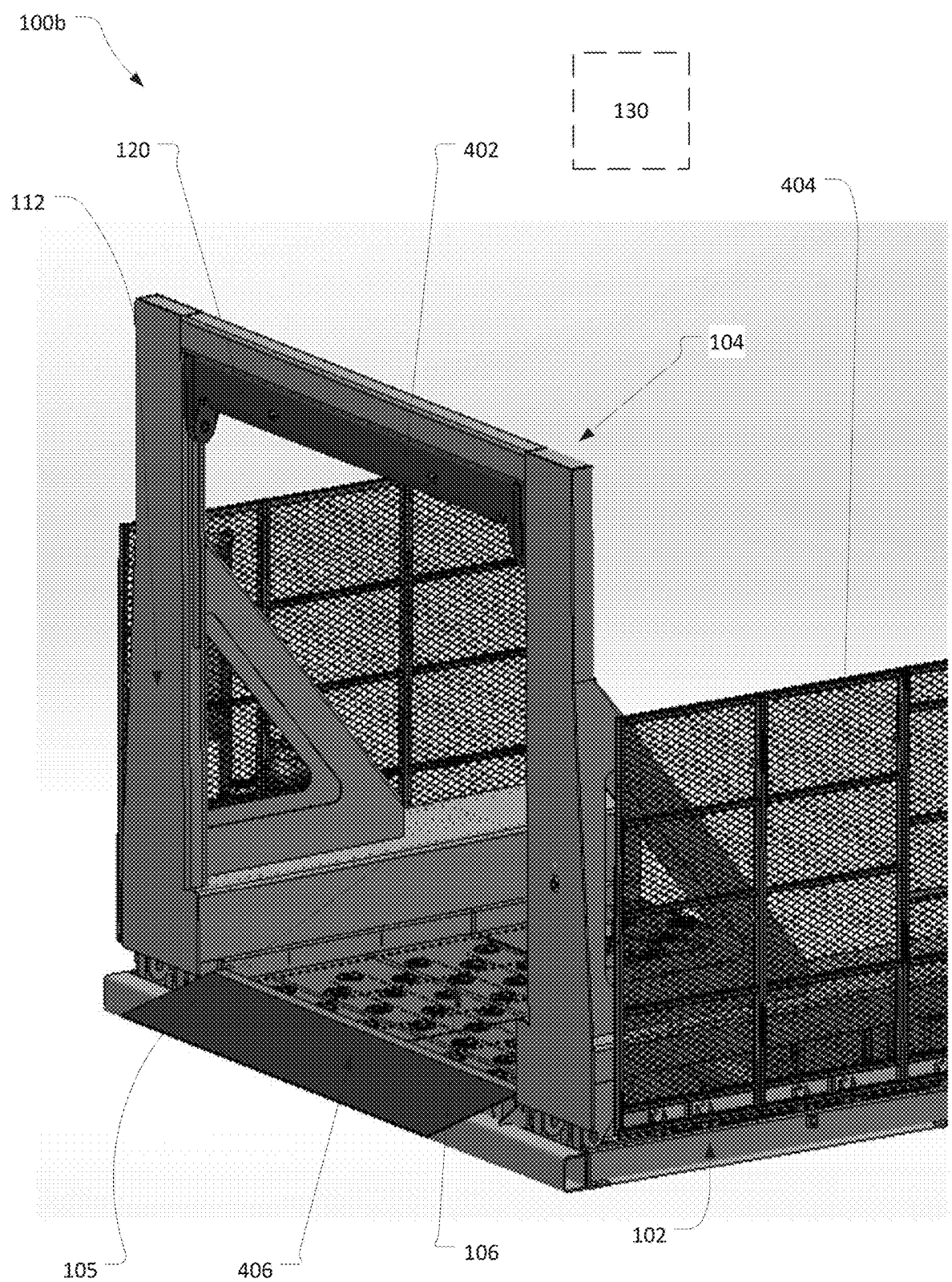
FIG. 4A is a front left isometric view of another example embodiment of a container unloading apparatus consistent with the present disclosure having a first and second side fence and an agitator proximate a second end of a platform.
Figure 4B:
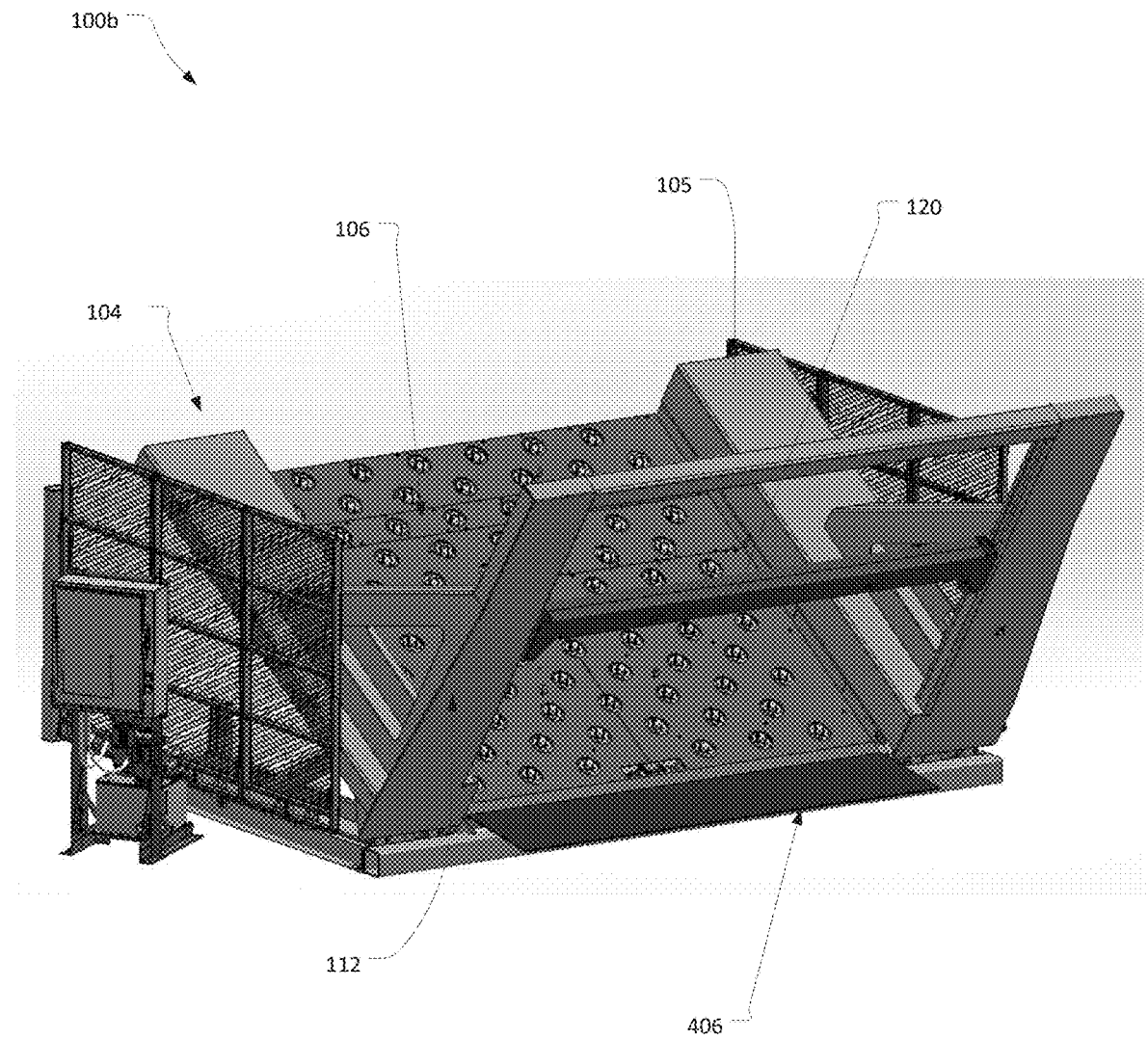
FIG. 4B is a front right isometric view of the container unloading apparatus shown in FIG. 4A, wherein the lift is transitioning from a loading position to an emptying position.

FIGS. 4A-4B illustrate a system 100b consistent with the including fences 402, 404 configured to surround a portion of the platform 106. These one or more fences 402, 404 may be configured to prevent an operator from inadvertently contacting moving components of the system and/or to prevent items emptied from a container from being ejected from the platform 106 or the door 122. As shown in FIGS. 4A-4B, a first and a second fence 402, 404 may be disposed along opposing sides of a platform 106. The fences 402, 404 are disposed on the base 102 such that they are external to the lift 104. The fences 402, 404 may include a solid sheet of material such as sheet metal, plexiglass.

In some embodiments, one or more of the fences 402, 404 may be in the form of a light curtain. The light curtain may be configured such that it creates a perimeter wherein operation of the system 100 is halted if the light curtain is broken. For example, the fences 402, 404 in the embodiment of FIGS. 4A-4B may be in the form of a light curtain and electrically coupled to the controller 130 such that when the light curtain is broken, the controller 130 halts operation of the machine.

As shown in FIGS. 4A-4B, some embodiments may further include an agitator. The agitator 406 may be coupled to the lift 104 proximate the second end 110 of the platform 106 and configured to agitate the items falling from the container and/or the container 131a, 131b itself to facilitate emptying of the contents of the container 131a, 131b. In some embodiments, a portion of the weight of the container 131a, 131b rests on the agitator 406 and the agitator 406 is configured to directly agitate the container 131a, 131b, 131c. In other embodiments, the platform 106 may be coupled to the frame 105 to allow reciprocating movement of the platform 106 relative to the frame 105 and the mast 112. The agitator 406 may be configured to agitate the container 131a, 131b by way of agitation of the platform 106. The agitator 406 may be electrically coupled to the controller 130 wherein the agitator 406 may agitate the container 131a, 131b in response to signals from the controller 130. For example, the controller 130 may send a signal to energize the agitator 406 when the lift 104 is in the emptying position.

Figure 5:
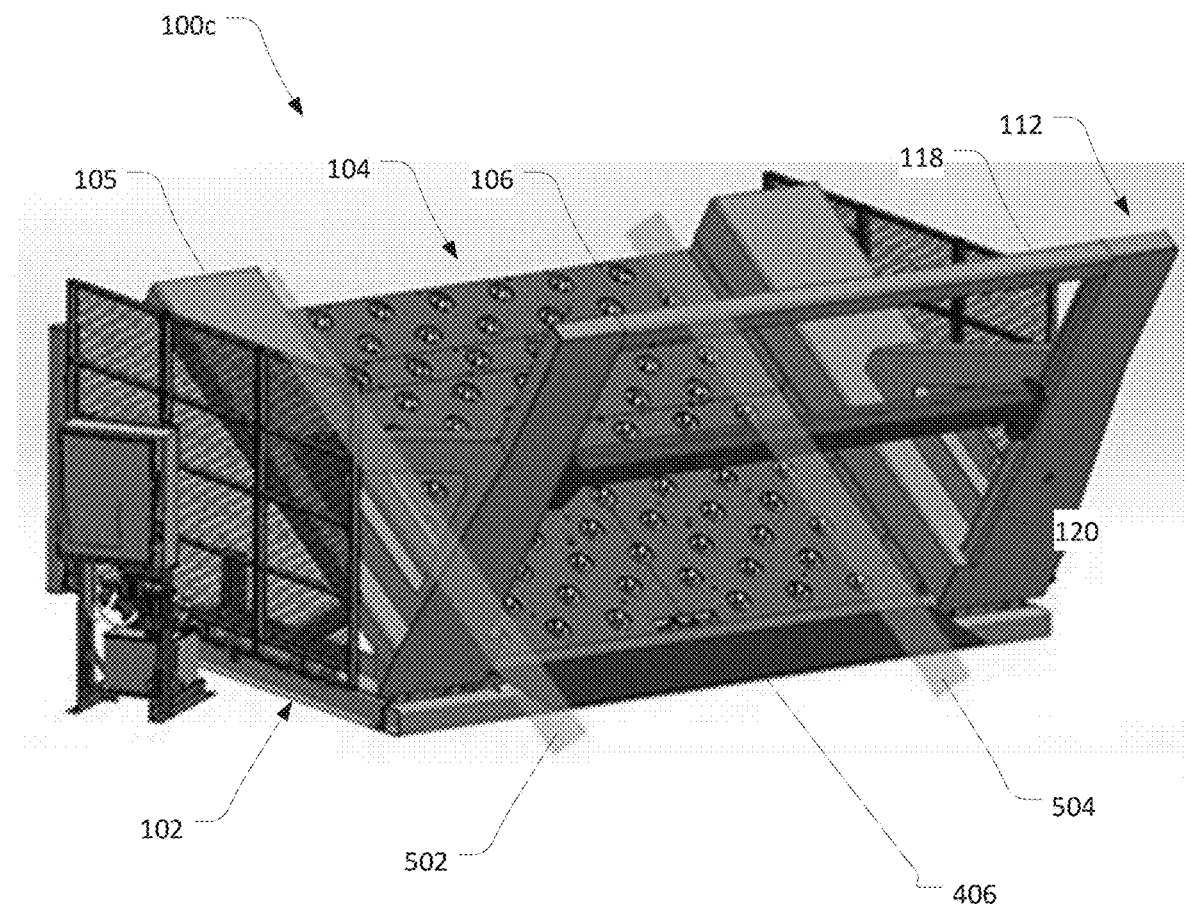
FIG. 5 is a front isometric view of a container unloading apparatus consistent with the embodiment including an airbag and spring pack for agitating a container.
Figure 6:
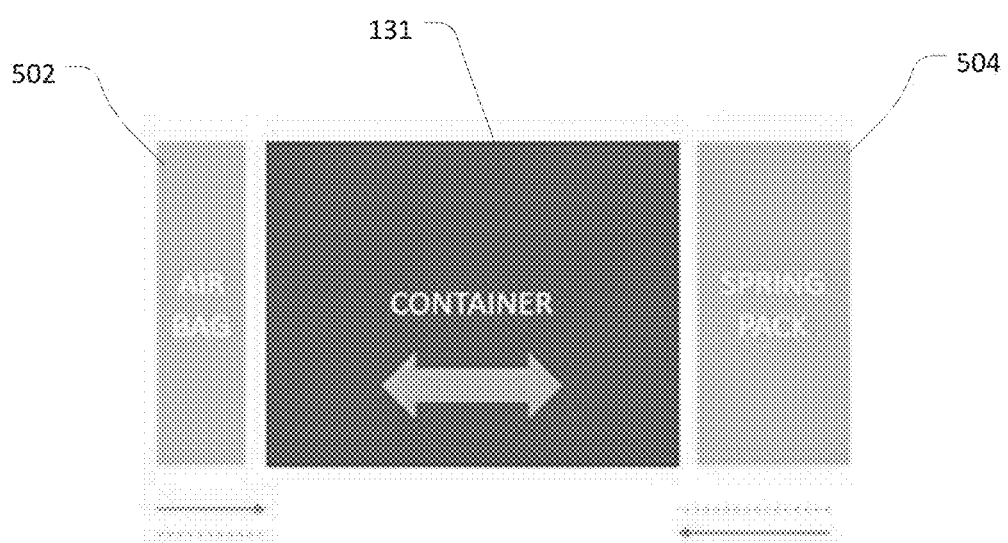
FIG. 6 diagrammatically illustrates operation of the embodiment illustrated in FIG. 5

FIGS. 5 and 6 illustrate another example of a system 100c consistent with the present disclosure including another configuration for agitating or jostling interlocked packages so they will disengage from each other and fall from a container 131 when the lift 104 is in the emptying position. In the illustrated example embodiment, an airbag 502 extends along at least a portion of the length of the platform 106 at one side of the platform 106 adjacent the frame 105 and a spring pack 504 extends along at least a portion of the length of the platform 106 at an opposite side of the platform 106 adjacent the frame 105.

The air bag 502 may be configured to inflate and deflate in response to control signals from the controller 130, and may be positioned against, or adjacent to, a first side of the container 131 when the container 131 is on the platform 106. The spring pack 504 may include one or more compression springs and may be positioned against, or adjacent to, a second side of the container 131 opposite to the first side of the container 131 when the container 131 is on the platform 106. The air bag 502 and the spring pack 504 need not directly contact the container and, instead, one or more intervening members may be disposed between the airbag 502 and/or the spring pack 504 and the sides of the container.

As diagrammatically illustrated in FIG. 6, the container 131 may be agitated or jostled to release interlocked packages from each other by successively inflating and deflating the air bag 502. When the air bag 502 inflates it forces the container 131 toward the opposite side of the platform 106 against the spring force provided by spring pack 504, thereby compressing the compression spring(s) in the spring pack 504. When the air bag 502 deflates, the spring pack 504 forces the container 131 back against the air bag 502. This results in side-to-side movement of the container 131 on the platform 106 to provide agitation or jostling of the container 131 and the items therein.

Although the illustrated example embodiment includes an airbag 502 and a spring pack 504 for agitation of the container 131, a variety of configurations are possible in a system consistent with the present disclosure. The airbag 502 and/or the spring pack 504 may be replaced by any other component for providing reciprocating or oscillating movement of the container 131. In one example embodiment, the airbag 131 may be replaced by an eccentric cam coupled to a shaft extending through the top surface of the platform 106. The shaft may be driven by a motor, e.g., in response to control signals from the controller 130, to rotate the eccentric cam and cause a plane of vibration to the container 131 in a direction parallel to a top surface of the platform 106. The spring pack 504 may respond to the vibration to force the container 131 back toward the eccentric came, thus causing side-to-side movement of the container 131 on the platform 106.

FIGS. 7A-7D illustrate another example embodiment of a system 100d consistent with the present disclosure. The illustrated example system 100d includes a base 102d, a lift 104d including a frame 105d and a mast 112d, a door 122d rotatably coupled to the lift 104d, a controller 130, and a lift actuator 700 coupled between the base 102d and the lift 104d for moving the lift 104d from a loading position shown in FIG. 7A to an emptying position shown in FIG. 7D. Also, one or more other features, e.g., the bale 120 of system 100 may be incorporated into the system 100d or any other system consistent with the present disclosure. The description of features discussed herein with respect to other embodiments will not be repeated for ease of explanation.

Figure 7A:
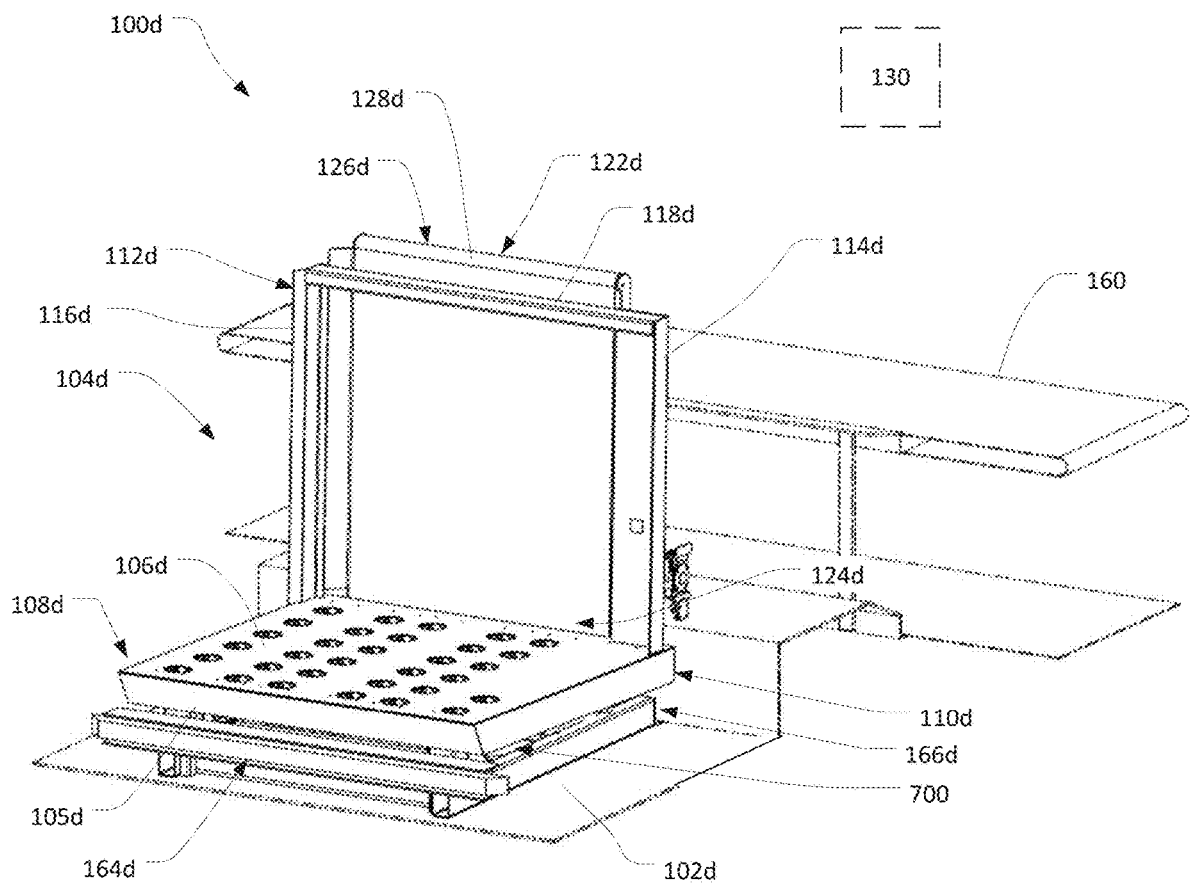
FIG. 7A is an isometric view of another example embodiment of a container unloading apparatus consistent with the present disclosure including a lift in a loading position and a door in a closed position.

The lift 104d includes the frame 105d and platform 106d supported by the frame 105d. The platform 106d is configured for supporting a container 131, 131a. The platform 106d includes a first end 108d for receiving the container and a second end 110d. In the loading position as shown in FIG. 7A, the first end 108d of the platform 106d is positioned adjacent a first end 164d of the base 102d and the second end 110d of the platform 106d is positioned adjacent a second end 166d of the base 102d. The mast 112d is provided adjacent the second end 110d of the platform 106d and includes first 114d and second 116d rails extending upwardly from the base 102d and relative to the platform 106d. A header 118d and/or a bale 120 (not shown in FIGS. 7A-7D) may be provided between the rails.

Figure 7B:
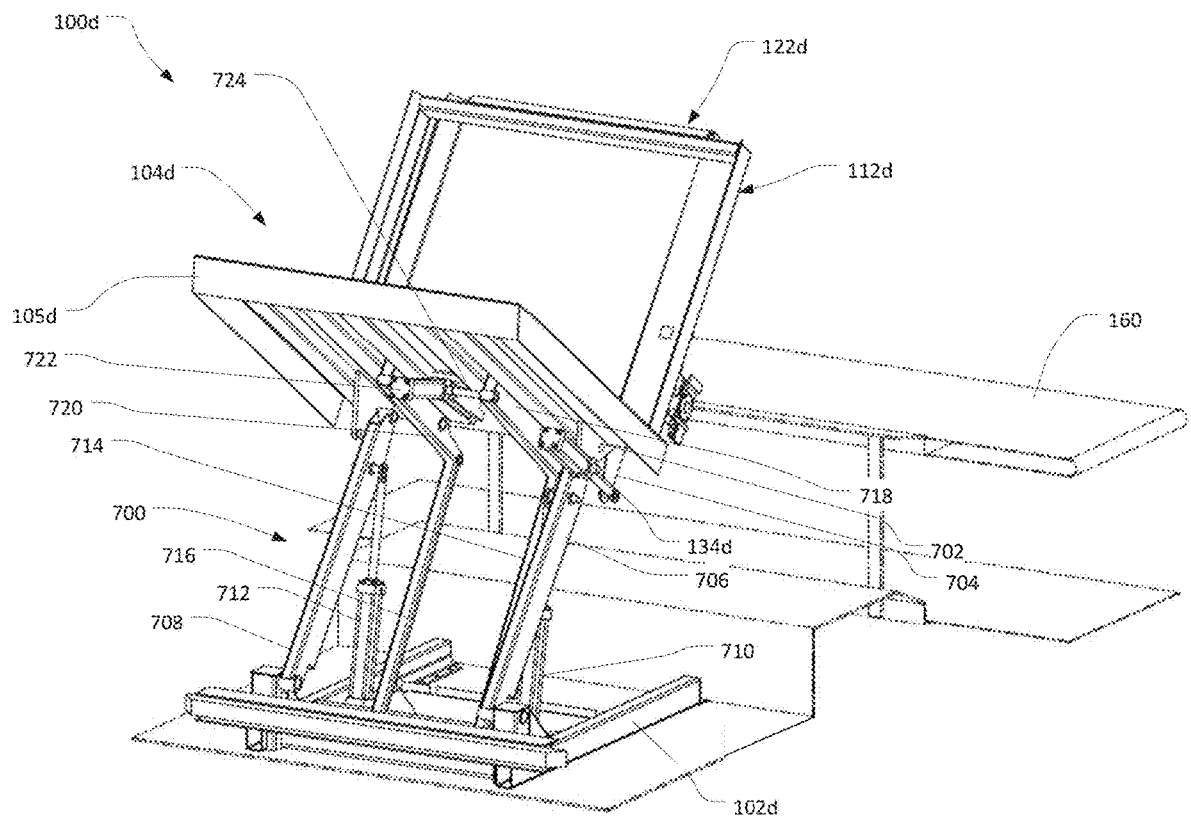
FIG. 7B is an isometric view of the container unloading apparatus shown in FIG. 7A with the lift in an intermediate position and the door in the closed position.
Figure 7C:
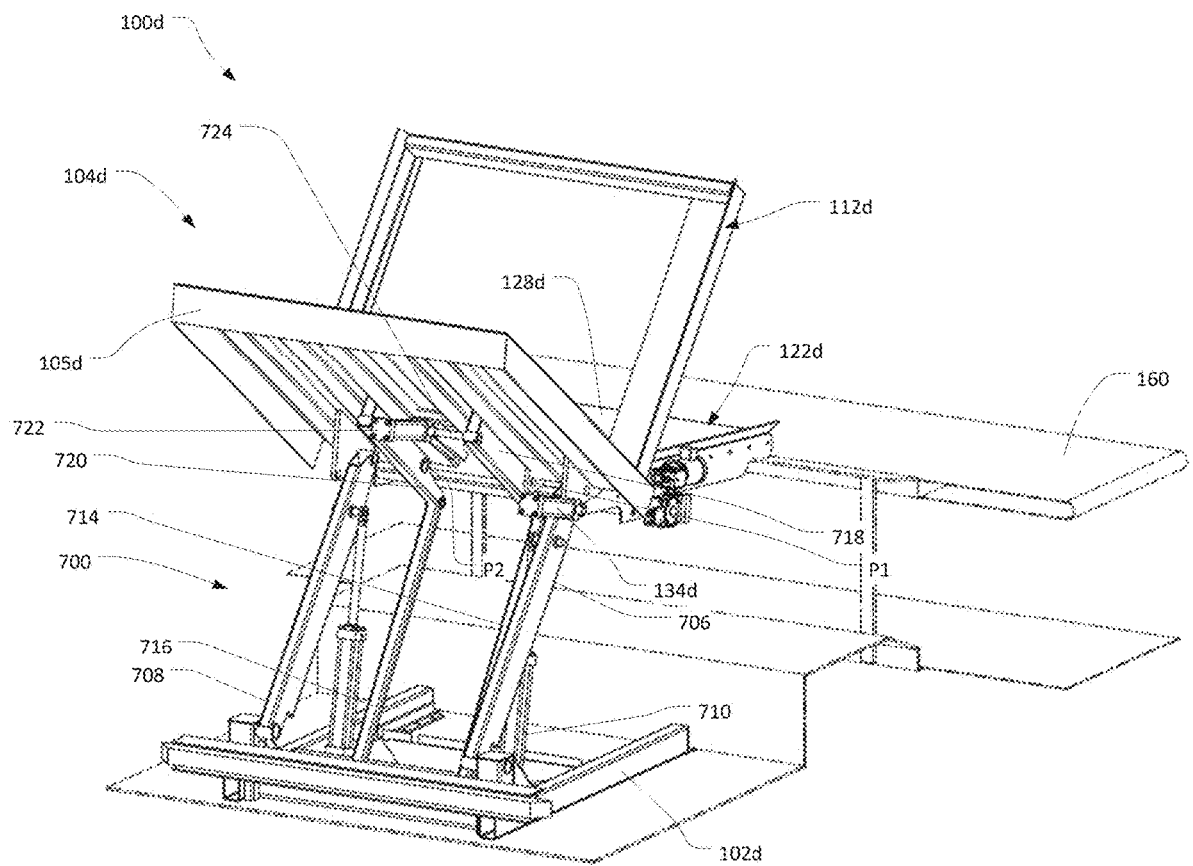
FIG. 7C is an isometric view of the container unloading apparatus shown in FIG. 7A with the lift in the intermediate position and the door in an open position.
Figure 7D:
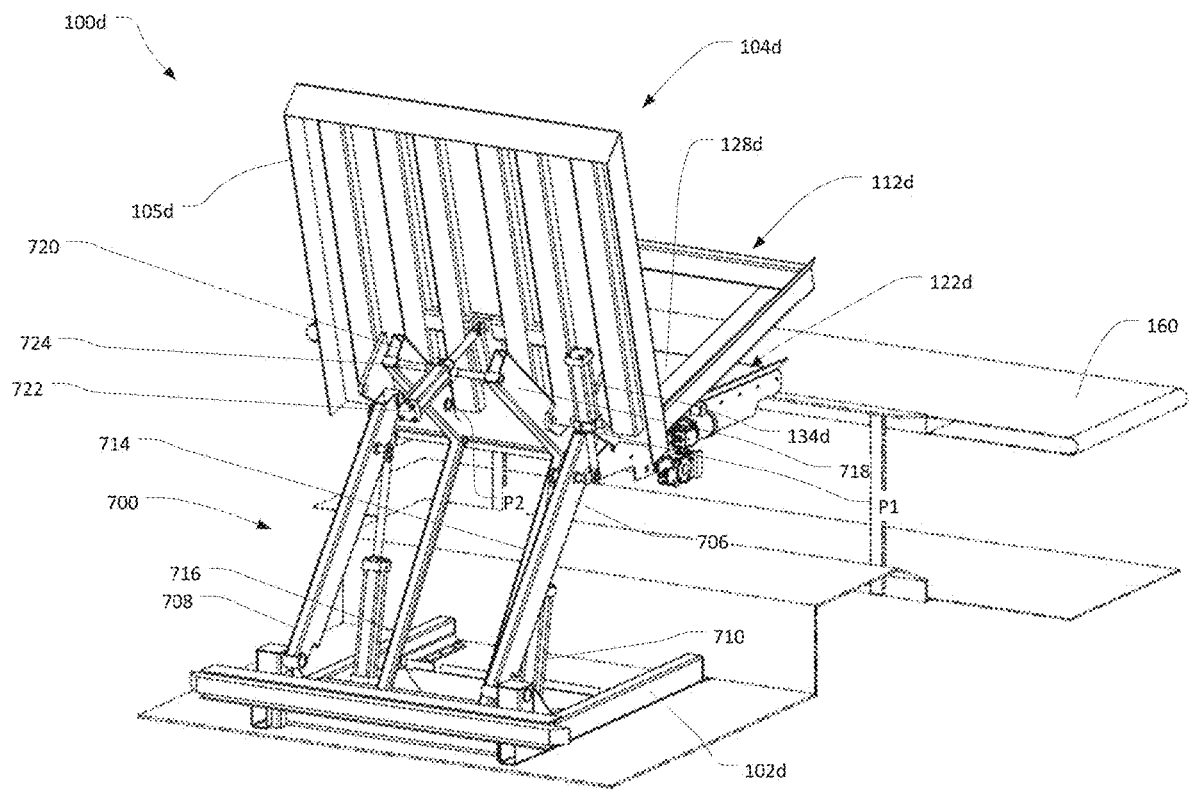
FIG. 7D is an isometric view of the container unloading apparatus shown in FIG. 7A with the lift in the emptying position and the door in the open position.

The door 122d has a bottom end 124d and a top end 126d. The bottom end 124d of the door 122d is pivotally coupled to the lift 104d adjacent the second end 110d of the platform 106d whereby the door 122d is configured to pivot relative to the mast 112d between a closed position shown in FIG. 7A and an open position shown in FIG. 7D. As shown in FIGS. 7B-7D, at least one door piston 134d may be extended or retracted for rotating the door 122d relative to the lift 104d for moving the door 122d to the open position and closed positions. In the illustrated example embodiment, a cylinder of the door piston 134d is coupled to a bottom of the frame 105d by a plate 702 and a rod of the door piston 134d is coupled to a plate 704 extending downward from the door 122d. Retraction and extension the door piston 134d may be controlled by control signals from the controller to pivot the door 122d between the open and closed positions.

The door 122d may include a conveyor 128d, such as a conveyor belt. The conveyor 128d is configured for conveying items placed on an inside surface of the conveyor 128d from the bottom end 124 toward the top end 126 of the door 122d to move items away from the lift 104d. In addition, or alternatively, the conveyor 128d may be configured conveying items placed on an inside surface of the conveyor 128d from the top end 126 of the door 122d toward the bottom end 124 of the door 122d to move items toward the lift 104d.

As best shown in FIGS. 7B-7D, in the illustrated example embodiment 100d, the lift actuator 700 includes first 706 and second 708 lift arms, first 710 and second 712 lift pistons, first 714 and second 716 constraint arms, first 718 and second 720 frame plates, and a rotation piston 722. Although the illustrated example includes two lift arms 706, 708, two lift pistons 710, 712, two constraint arms 714, 716, two frame plates 718,720, and a rotation piston 722, embodiments consistent with the present disclosure may include any number of these features, e.g. depending on the application. As with all the embodiments described herein, the embodiment illustrated in FIGS. 7A-7B is provided by way of example, not of limitation.

The first 706 and second 708 lift arms are rigid and elongate. A first end of each of the first 706 and second 708 lift arms is rotatably coupled to the base 102d adjacent the first end 164d of the base 102d and a second end of each of the first 706 and second 708 lift arms is rotatably coupled to the frame 105d at a position underneath the frame and adjacent the second end 110d of the platform 106d. A first end of each of the first 710 and second 712 lift pistons is rotatably coupled to the base 102d adjacent the first end 164d of the base 102d and a second end of each of the first 710 and second 712 lift pistons is rotatably coupled to the first 706 and second 708 lift arms, respectively, adjacent the second ends thereof.

In the illustrated example embodiment, the constraint arms 714,716 are rigid and elongate. A first end of the each of the first 714 and second 716 constraint arms is pivotally coupled to the base 102d adjacent a first end 164d of the base 102d and a second end of each of the first 714 and second 716 constraint arms is rotatably coupled to a first end of the first 718 and second 720 frame plates, respectively, adjacent the second end 110d of the platform 106d. The first 718 and second 720 frame plates are each pivotally coupled to the frame 105d at pivot points P1, P2 (FIGS. 7C and 7D), respectively. positioned between the first and second ends of the respective frame plates 718,720.

A mounting rod 724 is rotatably coupled to the first 118 and second 720 frame plates adjacent second ends of the first 718 and second 720 frame plates and extends between the first 718 and second 720 frame plates. A cylinder of the rotation piston 722 is coupled to the mounting rod 724. An end of the rod of the rotation piston 722 is rotatably coupled to the bottom of the frame 105d.

FIGS. 7A to 7D illustrate one example of a sequence of movements of the system 100d from the loading and emptying positions and the door 122d from the closed and open positions for emptying items from a container consistent with an embodiment of the present disclosure. In FIG. 7A a user may load a container, e.g. container 131, 131a, onto the platform 106d with an open end of the container positioned in opposed facing relationship to the door 122d. The system 100d is positioned with the door 122d in opposed facing relationship item receiver 160.

As shown in FIG. 7B, in response to control signals from the controller 130, the lift pistons 710,712 may transition the lift 104d from the loading position to an intermediate position by moving the lift arms 706, 708 and the lift 104d upward. As the lift arms 706, 708 extend the lift 104d upward lift arms 706, 708 and the constraint arms 714,716 may rotate relative to the base 102d, the lift 104d may rotate about the second ends of the lift arms 706, 708, and the frame plates 718, 720 may rotate about the second ends of the constraint arms 714, 716 to position the lift 104d in the intermediate position shown in FIG. 7B. When the rotation piston 722 is held in a retracted position, further rotation of the lift 104d beyond the intermediate position is prevented by the constraint arms 714,716 and the frame plates 718, 720.

When the lift 104d is in the intermediate position, the door piston 134d may extend in response to control signals from the controller 130 to cause rotation of the door 122d to the open position shown in FIG. 7C. In the open position, the door 122d may rest on, or be positioned adjacent to, the item receiver 160. As the door 122d transitions from the closed position to the open position, items from a container on the lift 104d may begin to empty onto the door 122d. A conveyor 128d of the door 122d may move the items from the container onto the item receiver 160.

With the lift 104d in the intermediate position shown in FIGS. 7A and 7B, the rotation piston 722 may extend in response to control signals from the controller 130 to rotate the lift 104d from the intermediate position to the emptying position shown in FIG. 7D. As the rotation piston 722 extends, the lift 104d rotates about the pivot points P1, P2 toward the item receiver 160 and the rotation piston 722 rotates with the mounting rod 724 upwardly relative to the frame plates 718,720 to the position shown in FIG. 7D. To maintain the door 122d on or adjacent to the item receiver 160 as the rotation piston 722 extends, the door piston 134d may be extended, as shown, in response to control signals from the controller 130. Further rotation of the lift 104d from the intermediate position to the emptying position empties further items from the container onto the door 122d from which the conveyor 128d may convey the items to the item receiver 160. From the emptying position shown in FIG. 7D, the controller 130 provide control signals to return the lift 104d to the loading position and the door 122d to the closed position, as shown in FIG. 7A. Consistent with one aspect of the present disclosure, there is provided an apparatus for emptying the contents of a container. The apparatus includes a base; a lift, the lift being movable between a loading position for receiving the container and an emptying position for emptying the container; and a lift actuator. The lift actuator includes at least one lift arm pivotally coupled to the base and the lift, at least one lift piston pivotally coupled to the base and the lift arm and configured to drive the lift from the loading position to an intermediate position between the loading position and the emptying position, at least one frame plate pivotally coupled to the lift at a pivot point, at least one constraint arm pivotally coupled to the base and the at least one frame plate, and at least one rotation piston coupled to the lift and the at least one frame plate and configured to rotate the lift about the pivot point from the intermediate position to the emptying position.

Consistent with another aspect of the present disclosure, the pivot point is positioned between a first end and a second end of the at least one frame plate, and wherein the at least one constraint arm is pivotally coupled adjacent the first end of the at least one frame plate.

Consistent with another aspect of the present disclosure, the at least one rotation piston is pivotally coupled to the at least one frame plate.

Consistent with another aspect of the present disclosure the apparatus includes first and second ones of the at least one frame plate, and wherein the at least one rotation piston is pivotally coupled to the first and second ones of the at least one frame plate by a mounting rod extending between the first and second ones of the at least one frame plate.

Consistent with another aspect of the present disclosure the apparatus includes a door having a bottom end and a top end, the bottom end of the door being pivotally coupled to the lift whereby the door is configured to pivot relative to the lift between a closed position wherein the top end of the door is positioned adjacent the container, and an open position wherein the top end of the door is positioned away from the container.

Consistent with another aspect of the present disclosure, the door includes a conveyor for moving the contents of the container from the bottom end of the door to the top end of the door when the door is in the open position.

Consistent with another aspect of the present disclosure, the apparatus further includes: a platform configured for supporting the container, the platform having a first end for receiving the container; a mast adjacent a second end of the platform, the mast including first and second rails extending upwardly relative to the platform; and first and second side walls coupled to first and second sides of the door, respectively, wherein the first and second sidewalls are configured to extend between the first and second rails of the mast when the door in the closed position.

Consistent with another aspect of the present disclosure, the apparatus further includes a platform configured for supporting the container, the platform having a first end for receiving the container; a mast adjacent a second end of the platform, the mast including first and second rails extending upwardly relative to the platform; and a mast guard configured to engage with the mast when the door is in the closed position.

Consistent with another aspect of the present disclosure the lift further includes: a platform configured for supporting the container, the platform having a first end for receiving the container, wherein the first end of the platform is positioned adjacent the base for loading the container when the lift is in the loading position and the first end of the platform is positioned away from the base when the lift is in the emptying position.

Consistent with another aspect of the present disclosure the platform has a second end and the lift further includes a mast adjacent the second end of the platform, the mast including first and second rails extending upwardly relative to the platform and a bale slidably coupled between the first and second rails for selectively adjusting a distance between the bale and the platform.

Consistent with another aspect of the present disclosure the mast further includes a header extending between the first and second rails, and wherein the bale is slidably coupled between the first and second rails and between the header and the platform.

Consistent with another aspect of the present disclosure the apparatus further includes an agitator proximate a second end of the platform configured to agitate items from the container to facilitate emptying the container.

Consistent with another aspect of the present disclosure the apparatus further includes a fence configured to surround a portion of the platform.

Consistent with another aspect of the present disclosure the apparatus further includes an air bag positioned at a first side of the platform for imparting a force against the container; and a spring pack positioned at a second side of the platform opposite from the first side of the platform for compressing in response to the force imparted against the container.

Consistent with another aspect of the present disclosure the apparatus further includes a light curtain configured to halt movement of the lift if the light curtain is broken.

Consistent with another aspect of the present disclosure there is provided an apparatus for emptying the contents of a container. The apparatus includes: a base; and a lift pivotally coupled to the base. The lift includes: a platform configured for supporting the container, the platform including a first end for receiving the container and a second end, a mast adjacent the second end of the platform, the mast including first and second rails extending upwardly relative to the platform, and a bale slidably coupled between the first and second rails for selectively adjusting a distance between the bale and the platform. The lift is pivotally coupled to the base to pivot between a loading position wherein the first end of the platform is positioned adjacent the base for loading the container on the platform, and an emptying position wherein the first end of the platform is positioned away from the base for emptying contents of the container from the second end of the platform.

Consistent with another aspect of the disclosure, the mast further includes a header extending between the first and second rails, and wherein the bale is slidably coupled between the first and second rails and between the header and the platform.

Consistent with another aspect of the disclosure the apparatus further includes a door having a bottom end and a top end, the bottom end of the door being pivotally coupled to the lift adjacent the second end of the platform, whereby the door is configured to pivot relative to the mast between a closed position wherein the top end of the door is positioned adjacent the mast, and an open position wherein the top end of the door is positioned away from the mast.

Consistent with another aspect of the disclosure, the door includes a conveyor for moving the contents of the container from the bottom end of the door to the top end of the door when the door is in the open position.

Consistent with another aspect of the disclosure, the apparatus further includes first and second side walls coupled first and second sides of the door, respectively, wherein the sidewalls are configured to extend between the first and second rails of the mast when the door in the closed position.

Consistent with another aspect of the disclosure, the apparatus further includes at least one lift piston pivotally coupled to the base; a lift riser pivotally coupled between the base and the lift and including a main arm coupled to the lift and pivotally coupled to the base at a pivot point, the at least one lift piston being pivotally coupled to the main arm and configured to rotate the lift and the main arm about the pivot point, and at least one lift riser piston coupled to the lift and to the main arm, the lift riser piston being configured to rotate the lift relative to the lift riser to raise the lift from a low position to a raised position.

Consistent with another aspect of the disclosure, the apparatus further includes an agitator proximate the second end of the platform configured to agitate items from the container to facilitate emptying the container.

Consistent with another aspect of the disclosure, the apparatus further includes a fence configured to surround a portion of the platform.

Consistent with another aspect of the disclosure, the apparatus further includes: an air bag positioned at a first side of the platform for imparting a force against the container; and a spring pack positioned at a second side of the platform opposite from the first side of the platform for compressing in response to the force imparted against the container.

Consistent with another aspect of the disclosure, the apparatus further includes a light curtain configured to halt movement of the lift if the light curtain is broken.

Consistent with another aspect of the present disclosure, there is provided method of emptying a container including placing a lift in a loading position; loading a container onto the lift; sliding a bale relative to first and second mast arm into a position such that the bale engages with a portion of the container; raising a door coupled to the lift such that the door is proximate a mast; tilting the lift about one end toward an emptying position to empty contents of the container onto the door; and returning the lift to loading position.

Consistent with another aspect of the disclosure, the method further includes agitating the lift when the lift is in the emptying position.

Consistent with another aspect of the disclosure, the method further includes positioning the container on the platform between an airbag and a spring pack; and successively inflating and deflating the airbag to agitate the container.

Consistent with another aspect of the present disclosure, there is provided an apparatus for emptying the contents of a container including: a base; a lift, the lift being movable between a loading position for receiving the container and an emptying position for emptying the container; at least one lift piston pivotally coupled to the base; and a lift riser pivotally coupled between the base. The lift riser includes: a main arm coupled to the lift and pivotally coupled to the base at a pivot point, the at least one lift piston being pivotally coupled to the main arm and configured to rotate the lift and the main arm about the pivot point, and at least one lift riser piston coupled to the lift and to the main arm, the lift riser piston being configured to rotate the lift relative to the lift riser to raise the lift from a low position to a raised position.

Consistent with another aspect of the disclosure, the main arm includes a central portion and a first extension, and wherein first forwardly projecting extension is pivotally coupled to the base at the pivot point.

Consistent with another aspect of the disclosure, the lift riser further includes a lift arm pivotally coupled to the main arm at a second pivot point and to the lift at a third pivot point.

Consistent with another aspect of the disclosure, the main arm includes a central portion and a first forwardly projecting extension extending from the central portion and a second forwardly projecting extension extending from the central portion, and wherein first forwardly projecting extension is pivotally coupled to the base at the pivot point, and the lift arm is pivotally coupled to the second forwardly projecting extension at the second pivot point.

Consistent with another aspect of the disclosure, the lift arm is generally U-shaped.

Consistent with another aspect of the disclosure, the lift riser further includes a connector arm pivotally coupled to the main arm at a fourth pivot point and coupled to the lift.

Consistent with another aspect of the disclosure, the main arm includes a central portion and a first forwardly projecting extension extending from the central portion, a second forwardly projecting extension extending from the central portion, and a rearwardly projecting extension extending from the central portion, and wherein first forwardly projecting extension is pivotally coupled to the base at the pivot point, the lift arm is pivotally coupled to the second forwardly projecting extension at the second pivot point, and the connector arm is pivotally coupled to the rearwardly projecting extension at the fourth pivot point.

Consistent with another aspect of the present disclosure there is provided an apparatus for emptying the contents of a container including: a base; a lift pivotally coupled to the base, the lift including a platform configured for supporting the container, the platform including a first end for receiving the container and a second end; and an agitator proximate the second end of the platform configured to agitate items from the container to facilitate emptying the container, the lift being pivotally coupled to the base to pivot between a loading position wherein the first end of the platform is positioned adjacent the base for loading the container on the platform, and an emptying position wherein the first end of the platform is positioned away from the base for emptying contents of the container from the second end of the platform.

Consistent with another aspect of the disclosure, the apparatus further includes a fence configured to surround a portion of the platform.

Consistent with another aspect of the disclosure, the apparatus further includes: an air bag positioned at a first side of the platform for imparting a force against the container; and a spring pack positioned at a second side of the platform opposite from the first side of the platform for compressing in response to the force imparted against the container.

Consistent with another aspect of the disclosure, the apparatus further includes a light curtain configured to halt movement of the lift if the light curtain is broken.

Consistent with another aspect of the disclosure there is provided an apparatus for emptying the contents of a container including: a base; a lift pivotally coupled to the base, the lift including a platform having a first end and a second end and configured for supporting the container, the lift being pivotally coupled to the base to pivot between a loading position wherein the first end of the platform is positioned adjacent the base for loading the container on the platform, and an emptying position wherein the first end of the platform is positioned away from the base for emptying contents of the container from the second end of the platform; an air bag positioned at a first side of the platform for imparting a force against the container; and a spring pack positioned at a second side of the platform opposite from the first side of the platform for compressing in response to the force imparted against the container.

Consistent with another aspect of the disclosure, the apparatus further includes a fence configured to surround a portion of the platform.

Consistent with another aspect of the disclosure, the apparatus further includes a light curtain configured to halt movement of the lift if the light curtain is broken.

Unless otherwise stated, use of the word "substantially" may be construed to include a precise relationship, condition, arrangement, orientation, and/or other characteristic, and deviations thereof as understood by one of ordinary skill in the art, to the extent that such deviations do not materially affect the disclosed methods and systems. The term "coupled" as used herein refers to any connection, coupling, link, or the like by which signals carried by one system element are imparted to the "coupled" element. Such "coupled" devices, or signals and devices, are not necessarily directly connected to one another and may be separated by intermediate components or devices that may manipulate or modify such signals. Likewise, the terms "connected" or "coupled" as used herein in regard to mechanical or physical connections or couplings is a relative term and does not require a direct physical connection. Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Throughout the entirety of the present disclosure, use of the articles "a" and/or "an" and/or "the" to modify a noun may be understood to be used for convenience and to include one, or more than one, of the modified noun, unless otherwise specifically stated. The terms "comprising", "including" and "having" are intended to be inclusive and mean that there may be additional elements other than the listed elements. The phrase "at least one of A and B" should be understood to mean "only A, only B, or both A and B."

Spatially relative terms, such as "beneath," below," upper," "lower," "above", "left", "right" and the like may be used herein for ease of description to describe one element or feature's relationship to another element(s) or feature(s) as illustrated in the drawings. These spatially relative terms are intended to encompass different orientations of the device in use or operation in addition to the orientation shown in the drawings. For example, if the device in the drawings is turned over, elements described as "below" or "beneath" other elements or features would then be oriented "above" the other elements or features. Thus, the exemplary term "below" may encompass both an orientation of above and below. The device may be otherwise oriented (rotated 90 degrees or at other orientations) and the spatially relative descriptors used herein interpreted accordingly.

Although the terms "first," "second," "third" etc. may be used to describe various elements, components, regions, layers and/or sections, these elements, components, regions, layers and/or sections are not to be limited by these terms as they are used only to distinguish one element, component, region, layer or section from another element, component, region, layer or section. Thus, a first element, component, region, layer, or section could be termed a second element, component, region, layer, or section without departing from the scope and teachings of the present invention.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention, which is not to be limited except by the following claims.

What is claimed is:

1. An apparatus for emptying the contents of a container comprising:
    a base;
    a lift, the lift being movable between a loading position for receiving the container and an emptying position for emptying the container; and
    a lift actuator comprising:
        at least one lift arm pivotally coupled to the base and the lift,
        at least one lift piston pivotally coupled to the base and the lift arm and configured to drive the lift from the loading position to an intermediate position between the loading position and the emptying position,
        at least one frame plate pivotally coupled to the lift at a pivot point,
        at least one constraint arm pivotally coupled to the base and the at least one frame plate, and
        at least one rotation piston coupled to the lift and the at least one frame plate and configured to rotate the lift about the pivot point from the intermediate position to the emptying position.

2. The apparatus of claim 1, wherein the pivot point is positioned between a first end and a second end of the at least one frame plate, and wherein the at least one constraint arm is pivotally coupled adjacent the first end of the at least one frame plate.

3. The apparatus of claim 1, wherein the at least one rotation piston is pivotally coupled to the at least one frame plate.

4. The apparatus of claim 1 comprising first and second ones of the at least one frame plate, and wherein the at least one rotation piston is pivotally coupled to the first and second ones of the at least one frame plate by a mounting rod extending between the first and second ones of the at least one frame plate.

5. The apparatus of claim 1 further comprising a door having a bottom end and a top end, the bottom end of the door being pivotally coupled to the lift whereby the door is configured to pivot relative to the lift between a closed position wherein the top end of the door is positioned adjacent the container, and an open position wherein the top end of the door is positioned away from the container.

6. The apparatus of claim 5, wherein the door comprises a conveyor for moving the contents of the container from the bottom end of the door to the top end of the door when the door is in the open position.

7. The apparatus of claim 5 further comprising:
    a platform configured for supporting the container, the platform having a first end for receiving the container;
    a mast adjacent a second end of the platform, the mast comprising first and second rails extending upwardly relative to the platform; and
    first and second side walls coupled to first and second sides of the door, respectively, wherein the first and second sidewalls are configured to extend between the first and second rails of the mast when the door in the closed position.

8. The apparatus of claim 5, further comprising:
    a platform configured for supporting the container, the platform having a first end for receiving the container;
    a mast adjacent a second end of the platform, the mast comprising first and second rails extending upwardly relative to the platform; and
    a mast guard configured to engage with the mast when the door is in the closed position.

9. The apparatus of claim 1, wherein the lift comprise a platform configured for supporting the container, the platform having a first end for receiving the container,
    wherein the first end of the platform is positioned adjacent the base for loading the container when the lift is in the loading position and the first end of the platform is positioned away from the base when the lift is in the emptying position.

10. The apparatus of claim 9, wherein the platform has a second end and the lift further comprises a mast adjacent the second end of the platform, the mast comprising first and second rails extending upwardly relative to the platform and a bale slidably coupled between the first and second rails for selectively adjusting a distance between the bale and the platform.

11. The apparatus of claim 10, wherein the mast further comprises a header extending between the first and second rails, and wherein the bale is slidably coupled between the first and second rails and between the header and the platform.

12. The apparatus of claim 9 further comprising an agitator proximate a second end of the platform configured to agitate items from the container to facilitate emptying the container.

13. The apparatus of claim 9 further comprising a fence configured to surround a portion of the platform.

14. The apparatus of claim 9 further comprising: an air bag positioned at a first side of the platform for imparting a force against the container; and a spring pack positioned at a second side of the platform opposite from the first side of the platform for compressing in response to the force imparted against the container.

15. The apparatus of claim 1 further comprising a light curtain configured to halt movement of the lift if the light curtain is broken.

* * * * *